US012699992B2

(12) United States Patent
Sugawara

(10) Patent No.: US 12,699,992 B2
(45) Date of Patent: Aug. 4, 2026

(54) INFORMATION PROCESSING APPARATUS AND INFORMATION PROCESSING SYSTEM

(71) Applicant: CANON KABUSHIKI KAISHA, Tokyo (JP)

(72) Inventor: Kazuhiro Sugawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 18/419,315

(22) Filed: Jan. 22, 2024

(65) Prior Publication Data

US 2024/0257114 A1     Aug. 1, 2024

(30) Foreign Application Priority Data

Jan. 26, 2023     (JP) ................................. 2023-010027

(51) Int. Cl.
*G06Q 20/38* (2012.01)
*G06F 8/61* (2018.01)

(52) U.S. Cl.
CPC ........... *G06Q 20/3825* (2013.01); *G06F 8/63* (2013.01); *G06Q 20/389* (2013.01)

(58) Field of Classification Search
CPC .. G06Q 20/3825; G06Q 20/389; G06Q 20/12; G06Q 20/123; G06Q 20/1235; G06Q 20/36; G06Q 2220/00; G06Q 2220/10; G06Q 30/0185; G06Q 30/0601; G06Q 30/0609; G06Q 30/0641; G06F 8/63; H04L 2209/56; H04L 9/3213; H04L 9/50; H04L 63/0807; H04L 63/0876; H04N 2201/0094
See application file for complete search history.

(56) References Cited

U.S. PATENT DOCUMENTS

| | | | | |
|---|---|---|---|---|
| 2004/0093595 | A1* | 5/2004 | Bilange | ..................... G06F 8/61 |
| | | | | 717/176 |
| 2018/0068097 | A1* | 3/2018 | Collin | ................. H04L 63/0892 |
| 2021/0365909 | A1 | 11/2021 | Shiina | |
| 2022/0131983 | A1* | 4/2022 | Hasegawa | .......... H04N 1/32283 |
| 2024/0039721 | A1* | 2/2024 | Young | ................... H04L 9/3213 |
| 2024/0096070 | A1* | 3/2024 | Figge | ................. G06V 10/7747 |

FOREIGN PATENT DOCUMENTS

JP          2021189475 A     12/2021

* cited by examiner

*Primary Examiner* — Jalatee Worjloh

(74) *Attorney, Agent, or Firm* — Canon U.S.A., Inc. IP Division

(57) ABSTRACT

An information processing apparatus includes one or more memories and one or more processors. The one or more memories and the one or more processors are configured to store an address, execute a predetermined application installed on the information processing apparatus, determine whether an address of a transmission destination of a non-fungible token (NFT) that is included in transaction data of the NFT corresponding to the predetermined application installed on the information processing apparatus is identical to the stored address, and restrict the predetermined application from being executed in a case where the address of the transmission destination is not identical to the stored address.

12 Claims, 21 Drawing Sheets

FIG.20

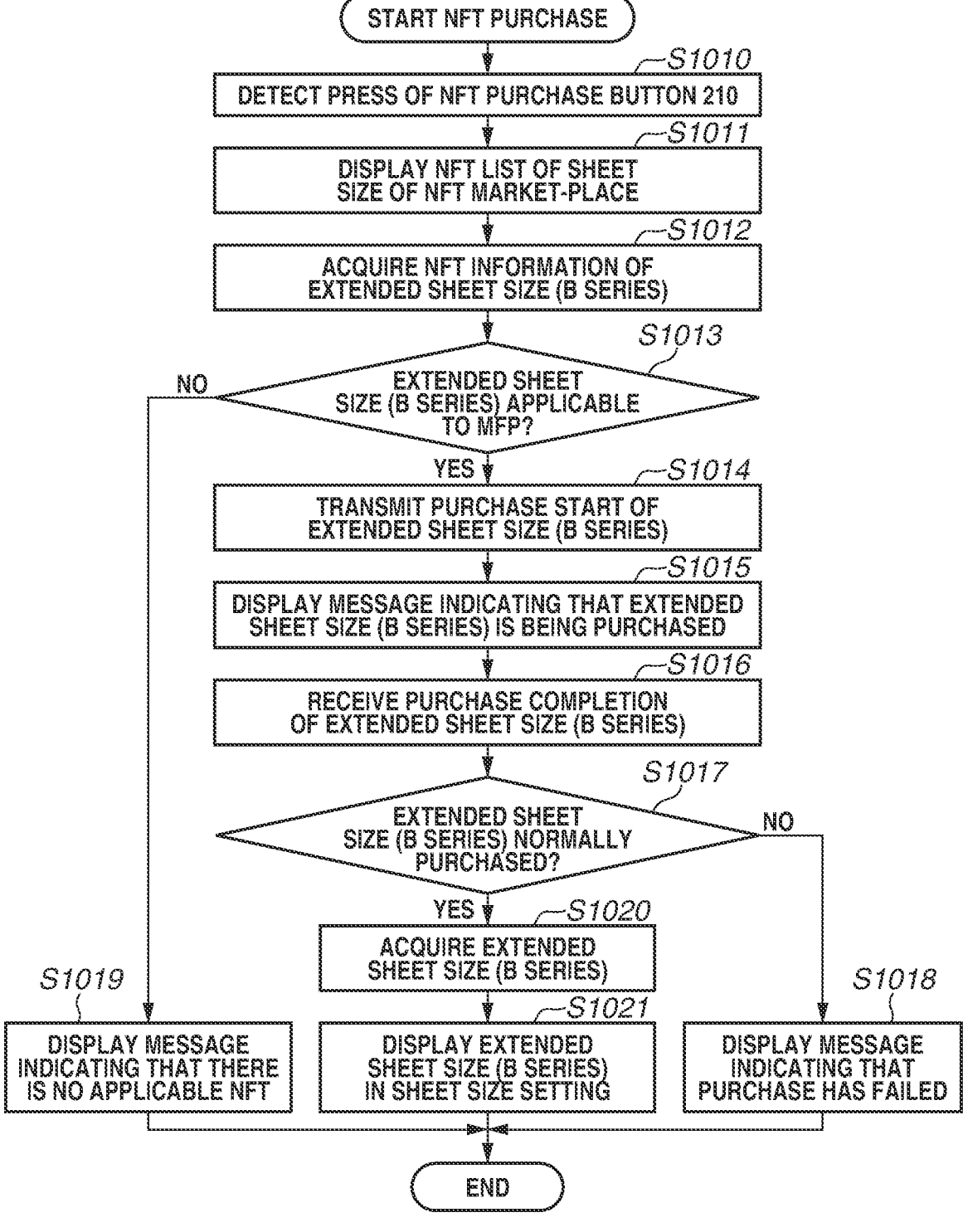

START NFT PURCHASE

S1010
DETECT PRESS OF NFT PURCHASE BUTTON 210

S1011
DISPLAY NFT LIST OF SHEET
SIZE OF NFT MARKET-PLACE

S1012
ACQUIRE NFT INFORMATION OF
EXTENDED SHEET SIZE (B SERIES)

S1013
EXTENDED SHEET
SIZE (B SERIES) APPLICABLE
TO MFP?

NO

YES
S1014
TRANSMIT PURCHASE START OF
EXTENDED SHEET SIZE (B SERIES)

S1015
DISPLAY MESSAGE INDICATING THAT EXTENDED
SHEET SIZE (B SERIES) IS BEING PURCHASED

S1016
RECEIVE PURCHASE COMPLETION
OF EXTENDED SHEET SIZE (B SERIES)

S1017
EXTENDED SHEET
SIZE (B SERIES) NORMALLY
PURCHASED?

NO

YES
S1020
ACQUIRE EXTENDED
SHEET SIZE (B SERIES)

S1021
DISPLAY EXTENDED
SHEET SIZE (B SERIES)
IN SHEET SIZE SETTING

S1019
DISPLAY MESSAGE
INDICATING THAT THERE
IS NO APPLICABLE NFT

S1018
DISPLAY MESSAGE
INDICATING THAT
PURCHASE HAS FAILED

END

INFORMATION PROCESSING APPARATUS AND INFORMATION PROCESSING SYSTEM

BACKGROUND

Field of the Disclosure

The present disclosure relates to an information processing apparatus and an information processing system.

Description of the Related Art

There has been conventionally a technique of issuing content data indicating a copyright work or the like, as a non-fungible token (NFT), and enabling its ownership to be moved between information processing apparatuses (Japanese Patent Application Laid-Open No. 2021-189475).

If data such as an application acquired from an unauthorized distributor is downloaded or installed onto an information processing apparatus, the information processing apparatus might be adversely affected, or fees might fail to be paid to an authorized distributor.

SUMMARY

Some embodiments of the present disclosure are directed to restricting processing on improperly acquired data in order to prevent unauthorized use of data.

According to an aspect of the present disclosure, an information processing apparatus includes one or more memories and one or more processors. The one or more memories and the one or more processors are configured to store an address, execute a predetermined application installed on the information processing apparatus, determine whether an address of a transmission destination of a non-fungible token (NFT) that is included in transaction data of the NFT corresponding to the predetermined application installed on the information processing apparatus is identical to the stored address, and restrict the predetermined application from being executed in a case where the address of the transmission destination is not identical to the stored address.

Further features of various embodiments will become apparent from the following description of exemplary embodiments with reference to the attached drawings.

BRIEF DESCRIPTION OF THE DRAWINGS

FIG. 20 is a flowchart illustrating an example of processing of downloading extended sheet size data of an NFT from the MP and adding the extended sheet size data to a sheet size setting of the MFP.

DESCRIPTION OF THE EMBODIMENTS

Hereinafter, exemplary embodiments of the present disclosure will be described in detail with reference to the drawings. The following exemplary embodiments are not intended to limit the appended claims, and not all combinations of features described in the exemplary embodiments are always essential to the solution of every embodiment of the disclosure.

<System Configuration Employed when NFT is Applied>

Figure 1:
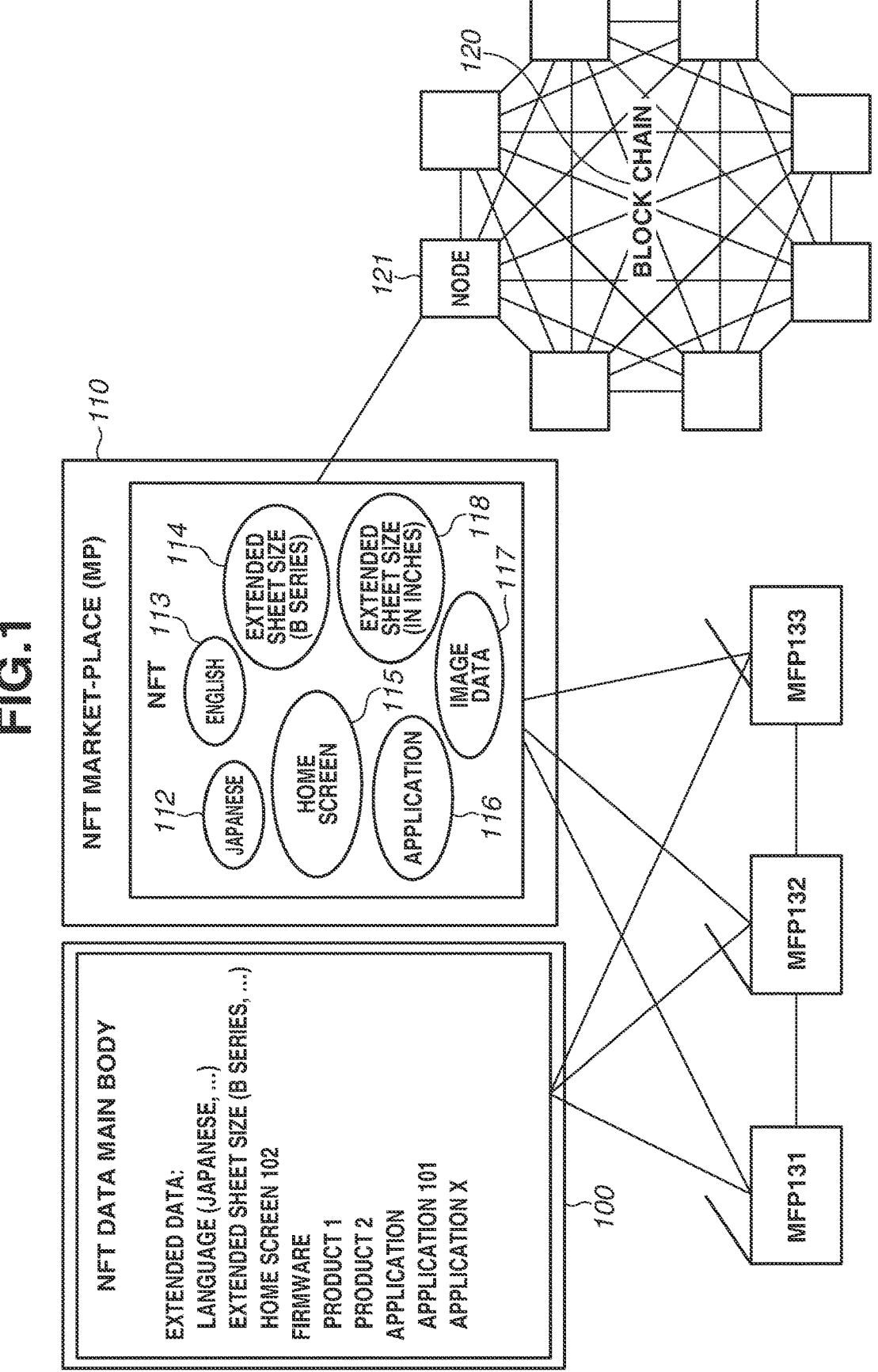
FIG. 1 is a system configuration diagram.

A first exemplary embodiment will be described. FIG. 1 is a system configuration diagram. FIG. 1 is a diagram illustrating an example of a market-place (MP) 110 of a non-fungible token (NFT) that sells and manages an NFT using a blockchain 120, and an information processing system for applying an NFT to an information processing apparatus. In FIG. 1, as an example of an information processing apparatus, multi-function peripherals (MFPs) 131 to 133 are configured to be connected to the MP 110. As the information processing apparatus, any apparatus can be applied as long as the apparatus can install an application, such as a mobile terminal, a smartphone, or a personal computer.

The blockchain 120 is a system including a plurality of information processing apparatuses that are provided as nodes 121 and perform peer-to-peer (P2P) communication therebetween. The blockchain 120 is also called a distributed ledger. The blockchain 120 uses a blockchain technique for sharing a history (transaction) of a plurality of blocked transactions using a chain structure. Thus, transactions managed and recorded using the blockchain 120 are characterized in that falsification is difficult to be committed, any loss can be prevented, and the owner can be surely identified.

The MP 110 is a service of a web application accessible using wallets (addresses) of the MFPs 131 to 133. The MP 110 is a service that provides transactions of a plurality of NFTs, and the MP 110 is provided by one or a plurality of server apparatuses. NFT data applicable to an information processing apparatus includes a Japanese NFT 112, an English NFT 113, an extended sheet size (B series) NFT 114, a home screen NFT 115, an extended sheet size (in inches) NFT 118, an application NFT 116, and an image data NFT 117. Aside from these, all pieces of data are applicable to NFTs as long as the data is digital data applicable to an information processing apparatus. The application NFT 116 is NFT data of an application to be executed by the MFPs 131 to 133 by being installed onto the MFPs 131 to 133. The Japanese NFT 112 and the English NFT 113 are NFT data of language data (font data) to be downloaded onto the MFPs 131 to 133 and used as display languages of the MFPs 131 to 133.

A wallet is an application for storing a secret key, a public key, an address, and a token amount (owned virtual currency) for each blockchain, and is to be used when connection to the MP 110 is established.

The home screen NFT 115 is NFT data of data for changing display modes of home screens of the MFPs 131 to 133. The extended sheet size (B series) NFT 114 is NFT data for adding a B series sheet size to candidates of a sheet size setting. The extended sheet size (in inches) NFT 118 is NFT data for adding a sheet size in inches to candidates for a sheet size setting.

Each individual piece of NFT data includes an address indicating a token identifier (ID) and an owner, and a token uniform resource identifier (URI) indicating a location of metadata 331. The metadata 331 includes a URI indicating the entity of NFT data, a name, description, and an attribute of NFT data. The metadata 331 may include digital data on the entity of NFT data. The metadata 331 and digital data are managed by a server different from the blockchain 120. According to the present exemplary embodiment, the metadata 331 and digital data are stored in a distributed file server (InterPlanetary File System: IPFS) 100 to prevent loss of digital data. In a case where the size of entity data of NFT is small like the above-described extended sheet size data (B series), the metadata 331 itself can be described in NFT data (transaction) and stored into the blockchain 120. In this case, by storing the entity of NFT data into the distributed file server 100, a storage location can be referred to based on a token URI of each NFT of the MP 110. The entity of NFT data is encrypted using a secret key owned by a wallet of the owner of an NFT and stored in the blockchain 120 in such a manner that only the owner can refer to the entity of NFT data.

The entity of the application NFT 116 to be described in the present exemplary embodiment is an application 101, the entity of the extended sheet size (B series) NFT 114 is extended sheet size data (B series) 103, and the entity of the home screen NFT 115 is home screen data.

<Downloading of NFT Data>

Figure 2:
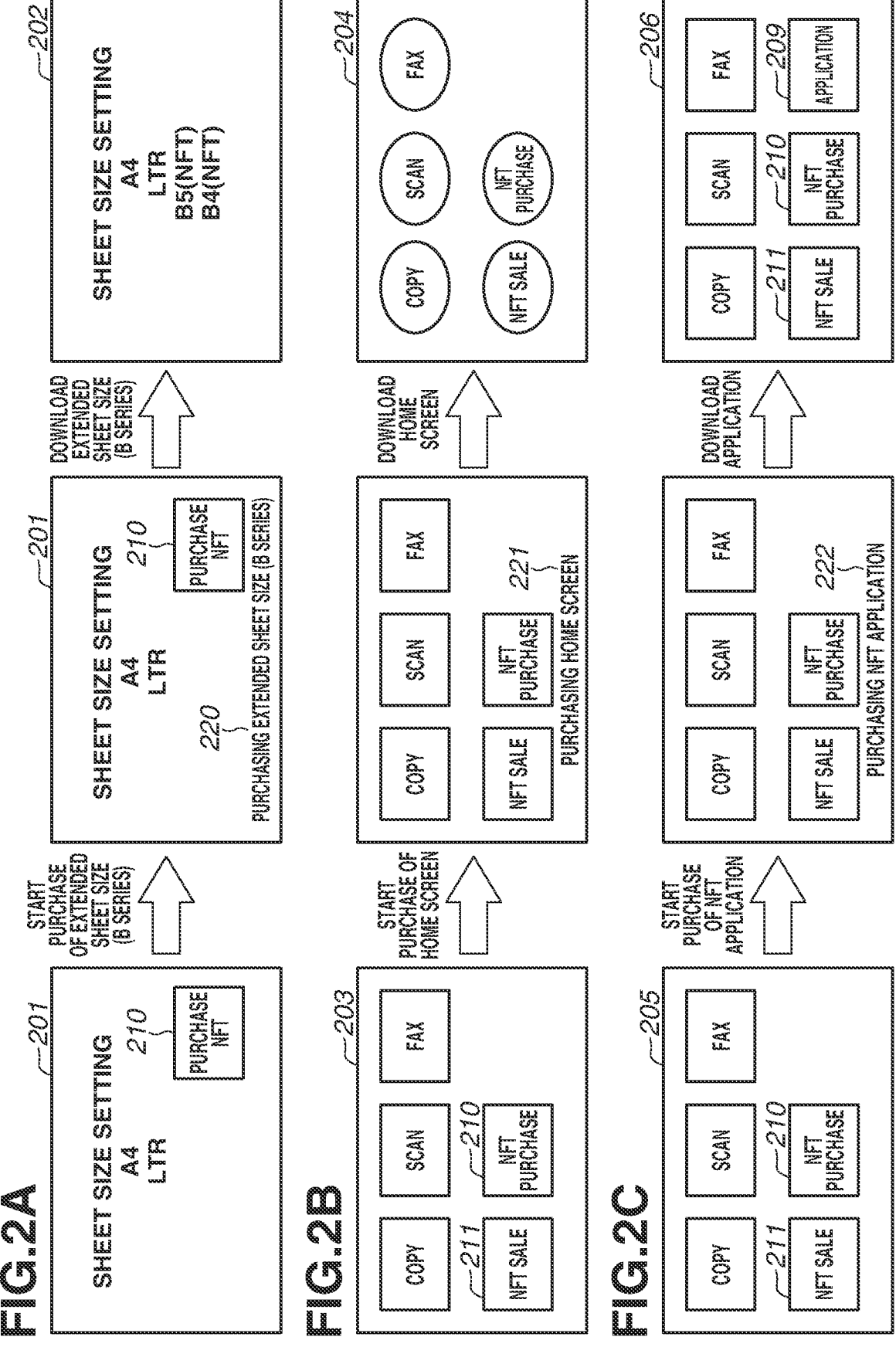
FIGS. 2A to 2C are diagrams each illustrating an example of a screen to be displayed on a multi-function peripheral (MFP) when non-fungible token (NFT) data is purchased.

FIGS. 2A to 2C are diagrams each illustrating an example of a screen to be displayed on an MFP when NFT data is purchased.

FIG. 2A illustrates an exemplary embodiment for purchasing extended sheet size data (B series) (NFT) by connecting to the MP 110 after an NFT purchase button 210 is pressed on a sheet size setting screen 201. After the NFT purchase button 210 is pressed, a message 220 indicating a purchasing state is displayed in the lower portion (status display portion) of the screen 201 until purchase completion is received from the MP 110. If the purchase completion is received from the MP 110, the extended sheet size data (B series) 103 serving as entity data of an NFT is downloaded from acquired NFT data, and B series sheet sizes are added to a sheet size setting screen 202. The status display portion is a portion to be always displayed even if the screen is switched. Because the message 220 is displayed in the status display portion until purchase processing is completed, the user can check a purchase status of an NFT during the execution of another operation.

FIG. 2B illustrates an exemplary embodiment for purchasing the home screen NFT 115 of the MP 110 after the NFT purchase button 210 is pressed on a home screen 203. Until purchase completion is received from the MP 110, a message 221 is displayed in the status display portion. If the purchase completion is received from the MP 110, the MFP 131 downloads the home screen NFT 115, and the home screen data serving as entity data of an NFT is applied to the MFP 131 from NFT data, and a home screen 204 including buttons in different shapes from those of the home screen 203 is displayed. In this manner, an NFT is applicable to digital data of a program related to display control of switching display modes of a home screen.

FIG. 2C illustrates an exemplary embodiment for purchasing the application NFT 116 of the MP 110 after the NFT purchase button 210 is pressed on a home screen 205. Until purchase completion is received from the MP 110, a message 222 is displayed in the status display portion. If the purchase completion is received, the MFP 131 downloads the application NFT 116 from the MP 110, and the application 101 serving as entity data of an NFT is downloaded from NFT data of the application NFT 116 and installed onto the MFP 131. On a home screen 206 of the MFP 131, a button 209 for the downloaded application 101 is displayed. If the button 209 is pressed (i.e., if a central processing unit (CPU) 402 receives an execution instruction for executing the application 101), the MFP 131 activates and executes the application 101.

The secondary distribution (exchange between MFPs) of NFTs after NFT purchase can be enabled by selecting an NFT sale button 211 to notify the MP 110 of the start of sale of an NFT. As a usage example, this configuration can be used when the MFP 131 is to be replaced. After the NFT sale button 211 is pressed before replacement, an NFT to be sold is displayed, and a selected NFT is brought into a for-sale state. Then, by pressing the NFT purchase button 210 on a replacement MFP by which the MFP 131 is replaced and selecting an NFT that is for sale, the same NFT data and entity data can be downloaded onto the replacement MFP. This use case employed during replacement is a case of using the uniqueness of an NFT, and has such advantages that a sales company can prevent unauthorized use, and the user needs not purchase the same application NFT for the replacement MFP.

<Transition of NFT Transaction>

Figure 3:
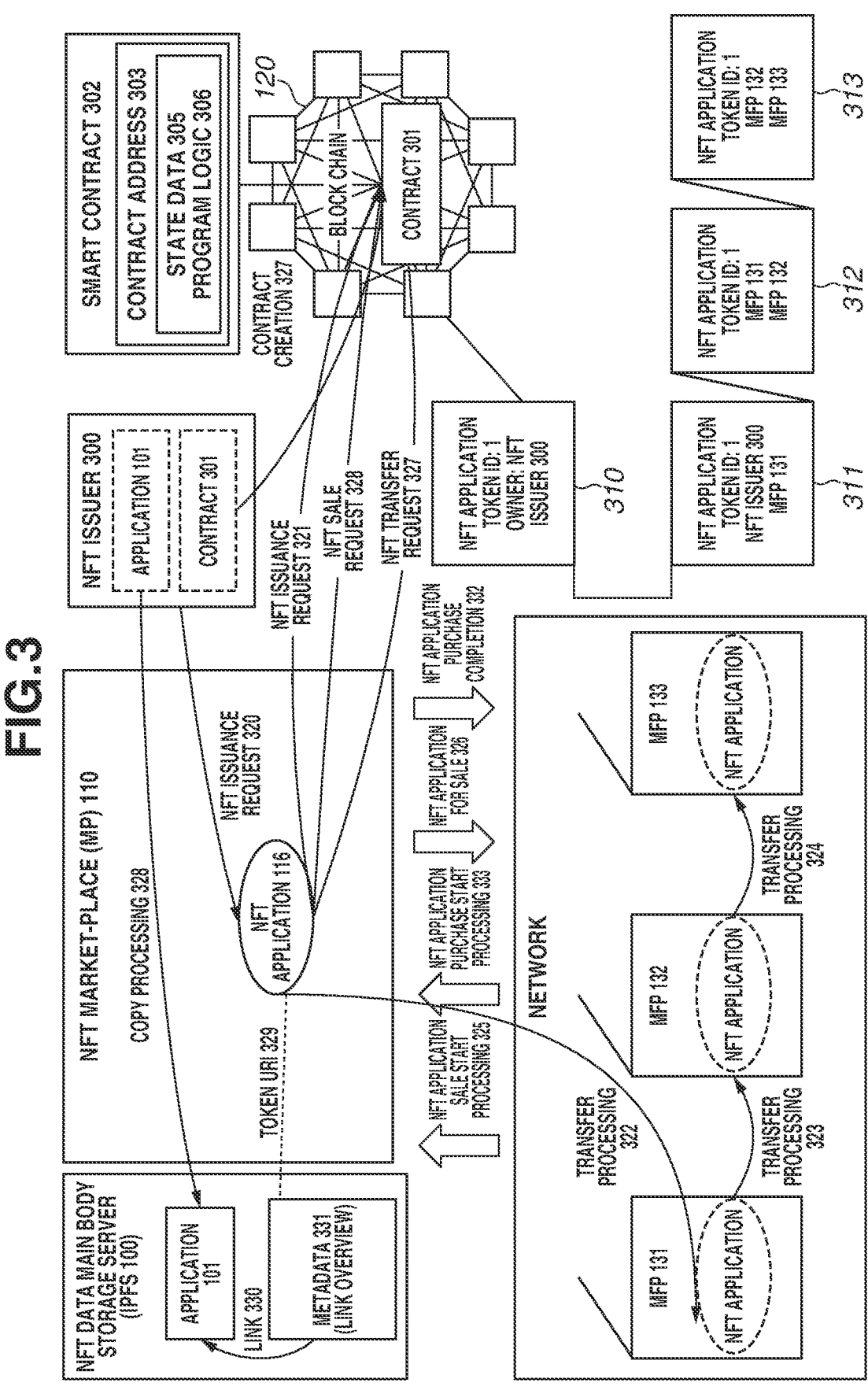
FIG. 3 is a diagram illustrating an example of transition of an NFT transaction.

FIG. 3 is a diagram illustrating an example of transition of an NFT transaction. As an example indicating the transition of a transaction of an NFT and the blockchain 120, FIG. 3 illustrates an example in which the MFP 131 purchases the application NFT 116, and the purchased application NFT 116 is transferred to the MFPs 132 and 133. The application 101 may be an application for causing the MFP 131 to execute a cloud print function by which a print engine 413 prints an image that is based on image data received from a cloud server, for example. Alternatively, the application 101 may be an application for causing the MFP 131 to execute a cloud scan function for uploading image data generated by a scan executed by a scanner 415 of the MFP 131, to a cloud server. Alternatively, the application 101 may be an application for causing the MFP 131 to execute a SEND function of sending the generated image data by e-mail, or a FAX function of sending the generated image data by FAX, instead of the cloud scan function. Alternatively, the application 101 may be an application for causing the MFP 131 to execute a copy function by which the print engine 413 prints an image onto a sheet based on image data generated by a scan executed by the scanner 415 of the MFP 131.

An NFT issuer 300 creates a contract 301 for the application 101, and adds the contract 301 to the blockchain 120 as a block of the blockchain 120 based on Remote Procedure Call (RPC) of an NFT transfer request 327. This block is called the contract 301, and is accessed based on an address on the blockchain 120 similarly to a transaction indicating the movement of the owner of a token (NFT). The RPC is a method of designating a URL indicating an address on the blockchain 120, through communication executed using a HyperText Transfer Protocol (HTTP) and a JavaScript Object Notation (JSON) file, describing a command for the blockchain 120 in a HyperText Markup Language (HTML) body in a JSON file format, and executing the command. A response to the RPC is received also in the JSON file format. The contract 301 is a block that executes a smart contract 302, such as the issuance of an NFT, the change (transfer) of an NFT owner, the deletion of an NFT, and a sale setting of an NFT. The smart contract 302 includes a contract address 303 indicating a destination on the blockchain 120, a state data 305 indicating a state of an NFT, and a program logic 306 for executing the movement of a token when an NFT is issued or transferred. In the program logic 306, processing for generating a transaction on the blockchain 120, such as the payment of a virtual currency from a transfer destination to a transfer source, royalty payment to an NFT distributor, and exclusive control, is described. In the following description, the detailed description of the program logic 306 will be omitted, and the expression "to execute the program logic 306" is used.

The NFT issuer 300 copies the application 101 onto the distributed file server 100, and acquires a link 330 indicating a storage location from the distributed file server 100. The NFT issuer 300 that has acquired the link 330 creates metadata 331 in which the overview (attribute, name, image, description) of the link 330 and the application 101 is described, and copies the metadata 331 onto the distributed file server 100.

In response to an NFT issuance request 320, the NFT issuer 300 uploads a token URI 329 indicating the address of the NFT issuer 300, the contract address 303, and the location of the metadata 331, to the MP 110.

The metadata of the application 101 that is to be referred to based on the token URI 329 is given below. A file name is "application NFT.Json" and the description is as shown below.

```
application NFT.Json:
{
"attribute":[{
"model":"MFP1",
"capability":["scan", "print", "network", "color"],
"required memory":5,000,000,
```

-continued

```
"panel type":"5-inch WVGA",
"application":"https://application 101" (link 330)
},{
"model":"MFP2",
"capability":["scan", "print", "network", "color"],
"required memory":5,000,000,
"panel type":"5-inch WVGA",
"application":"https://application 101" (link 330),
}],
"description":"application NFT Print/Scan",
"image":"https://ipfs/application101.jpg",
"name":"application NFT",
}
```

The "attribute" is information indicating whether an NFT is applicable. In the above-described example, the "attribute" is indicated as an array for each applicable model. In this example, "model", "function (capability)", "required memory" as required memory size, "panel type", "application (the link 330)" for each of the two models MFP1 and MFP2 are indicated. The location of the entity of an application NFT in the present exemplary embodiment is indicated by the URI (https://application 101) of "application", and the same application is indicated. Nevertheless, entities of applications varying between the MFP1 and MFP2 may be indicated. The "description" indicates the description of the application 101. The "image" indicates, as the URI (https://ipfs/application101.jpg), the location of a home screen of an MFP or data of a thumbnail to be displayed on the MP 110. The "name" indicates the name "application NFT" of the application NFT. In the metadata stored in the location indicated by the token URI 329, an applicability condition of the application NFT 116 is described in the "attribute", and the MFP 131 uses the applicability condition to determine whether the application 101 is applicable to an MFP.

The MP 110 that has received the NFT issuance request 320 transmits, to the contract address 303, an NFT issuance request 321 in which an address of the NFT issuer 300 and a token URI are set.

The smart contract 302 that has received the NFT issuance request 321 executes the program logic 306, and generates transaction data 310 for issuing the application NFT 116. The MP 110 issues a token ID as 1, generates a transaction block of which the owner is set to the NFT issuer 300, and makes a request to add the transaction block to the blockchain 120. By monitoring the state data 305 of the smart contract 302, the MP 110 determines whether the transaction data 310 has been added. The transaction data 310 is data corresponding to the application NFT 116 that is accessible using the contract address 303 and a token ID. If the transaction data is generated, the owner is set to the NFT issuer 300, and the transaction data is released on the MP 110. After NFT issuance, a history such as movement of the owner or a change or deletion of a sale attribute is recorded in the blockchain 120.

The MP 110 generates a transaction in which the address of the NFT issuer 300 is set and an NFT sale attribute is set to "for sale", and transmits an NFT sale request 328 to the contract address 303. The smart contract 302 that has received the NFT sale request 328 executes the program logic 306, and adds a transaction in which a sale attribute of the application NFT 116 is set to "for sale" from "not for sale", so that the application NFT 116 becomes purchasable.

The content of the transaction data 310 included in the transaction block recorded in the blockchain 120 will be described based on an NFT configuration (transaction data 310) shown in Table 1 below.

TABLE 1

| NFT configuration (transaction data 310) | |
| --- | --- |
| Block number | Index on block chain |
| Token ID | ID of token |
| Owner address | Character string including 42-digit hexadecimal number |
| Token URI | Location of metadata 331: http:// . . . /application. Json |
| Contract address | Character string including 42-digit hexadecimal number: contract address 303 that executes smart contract 302 is indicated. |
| From | Movement source of owner |
| To | Movement destination of owner |
| Sale attribute | For sale or not for sale |
| . . . | Others, virtual currency, hash value, signature |

A block number is an index of transaction data stored on the blockchain 120. A token ID is an ID of an NFT that indicates that the transaction data is unique data serving as an NFT. In an NFT, an owner address corresponding to a token ID is set on a one-to-one basis.

In the present exemplary embodiment, 1 is set as a token ID immediately after NFT issuance, and the transaction data 310 is added onto the blockchain 120 as a transaction. The owner address is an address indicating the owner of NFT data, and represented by a character string including a 42-digit hexadecimal number.

This owner address is an address of a wallet set as the owner. When the MFP 131 is the owner of an NFT, the address of the wallet of the MFP 131 is recorded as an owner address. In this example, the MFP 131 is represented as the owner of an NFT, but the attribute needs not be "owner".

The address is indicated by a destination (address) indicating a token output destination on the blockchain 120, and the address is stored into a wallet by an information processing apparatus that uses the blockchain 120. In the present exemplary embodiment, there are two types of addresses. One of these is an address held by a wallet, and the other one is an address for executing the smart contract 302. The contract address is an address indicating a block that executes the smart contract 302 that executes a transaction of an NFT. When the contract 301 is created, the contract address is acquired from the blockchain 120. "From" indicates an address of a transfer source from which an NFT is transferred. The address of the owner may be used. "To" indicates an address of a transfer destination to which an NFT is to be transferred. A sale attribute is an attribute indicating whether an NFT is for sale or not for sale. Aside from these, virtual currency, hash value, and signature that are necessary for adding a transaction block to the blockchain 120 are also included.

In the above-described transaction data 310, the owner address is identical to the address indicated by "To" that is a transmission destination address of an NFT. The owner address may be an address of the distributor of an NFT, and "To" may indicate an address of the current owner of the NFT.

The transaction data 310 is data to be managed by the blockchain 120, and is generated based on information regarding a transaction of an NFT. Nevertheless, the transaction data 310 is not always generated in accordance with the transfer of an NFT. In some cases, the transaction data 310 is generated in accordance with the update or change of a parameter, such as sale attribute. In this case, as "From"

and "To" in the transaction data 310, values of "From" and "To" of transaction data generated in accordance with the latest transfer are included. Alternatively, an address indicated by "To" of a transaction generated in accordance with the latest transfer may be set in an owner address separately prepared as an attribute, without setting information to "From" and "To" in transaction data generated without involving transfer. An address of the current owner may be set in both of "From" and "To" of transaction data generated without involving transfer.

Next, transfer processing 322 for the application NFT 116 in which the MFP 131 purchases the application NFT 116 in a procedure illustrated in FIG. 2C will be described.

The MFP 131 acquires information regarding the application NFT 116 of the MP 110, and executes purchase start processing 333 for the application NFT 116 of the MP 110. The movement of an NFT owner that is caused by the purchase start processing 333 for the application NFT 116 is executed by the MP 110. If the MP 110 receives a request for executing the purchase start processing 333, the MP 110 transmits, to the contract 301, the NFT transfer request 327 for changing the address of the NFT issuer 300 as the original owner of the application NFT 116, to a transfer source (From), and the address of the MFP 131 to a transfer destination (To). The smart contract 302 generates a transaction 311 for changing the owner from the NFT issuer 300 to the MFP 131, executes the program logic 306, and issues a request to add a block of the generated transaction 311 to the blockchain 120. If it is confirmed based on the state data 305 that the transaction 311 has been added, it is determined that the owner of the application NFT 116 has been changed to the MFP 131. The MP 110 transmits a purchase completion response 332 to the MFP 131, and if the MFP 131 receives the purchase completion response 332 from the application NFT 116, the MFP 131 downloads and installs the application 101.

Next, transfer processing 323 for the application NFT 116 in which the MFP 132 purchases the application NFT 116 in a procedure illustrated in FIG. 2C will be described.

If the MFP 131 executes the sale of the application NFT 116 on the MP 110 by pressing the NFT sale button 211, the MFP 131 transmits a request for executing sale start processing 325 to the MP 110. The MP 110 generates a transaction in which the NFT sale attribute is set to "for sale", and transmits the NFT sale request 328 to the contract address 303. The smart contract 302 that has received the NFT sale request 328 executes the program logic 306, and issues a request to add a transaction in which the sale attribute of the application NFT 116 is set to "for sale", to the blockchain 120. If the transaction with the sale attribute changed is added to the blockchain 120, the MP 110 transmits a for-sale response 326 to the MFP 131. If the MFP 131 receives the for-sale response 326, the MFP 131 deletes the application 101 installed on the MFP 131, from a storage device 405 of the MFP 131. In addition, the application NFT 116 serving as NFT data of the application 101 is also deleted.

On the MFP 132, to purchase the application NFT 116 from the MP 110, the user presses the NFT purchase button 210 illustrated in FIG. 2C. A screen of the MP 110 is accordingly displayed. An example of the screen of the MP 110 will be described below with reference to FIG. 9. When an NFT purchase button 736 displayed on an NFT detailed display screen 737 of the MP 110 is selected, the MFP 132 transmits a request for executing the purchase start processing 333 to the MP 110. If the MP 110 receives the request for executing the purchase start processing 333, the MP 110 transmits, to the contract 301, the NFT transfer request 327 to change an address of the MFP 131 that is the owner of the application NFT 116 to a transfer source (From), and the address of the MFP 132 to a transfer destination (To). The smart contract 302 generates a transaction 312 to change the owner from the MFP 131 to the MFP 132, executes the program logic 306, and transmits a request to add a block of the generated transaction 312 to the blockchain 120. If it is confirmed based on the state data 305 that the transaction 312 has been added, the owner of the application NFT 116 has been changed to the MFP 132. The MP 110 transmits the purchase completion response 332 to the MFP 132, and registers the MFP 132 as the owner of the application NFT 116.

Because transfer processing 324 is similar to the transfer processing 323, the description thereof will be omitted. A block of a transaction 313 is generated by the execution of the transfer processing 324.

In this manner, blocks including the pieces of transaction data 310, 311, 312, and 313 are added to the blockchain 120 by the blockchain technique. Then, because the blocks are monitored by a plurality of nodes on the blockchain 120, an operation such as falsification, change, or deletion of blocks becomes inexecutable. Thus, the application NFT 116 always exists in the blockchain 120 as one NFT. Because data of the application 101 which is entity data stored in the storage device 405 of the MFP 131 is deleted during a sale operation of an NFT, it is possible to prevent the application 101 from being improperly copied and distributed. In addition, because the owner of the application NFT 116 can be identified from the blockchain 120, in a sales company of the application, an ownership history of the application NFT 116 can be tracked.

In addition, when activating and executing the application 101, each of the MFPs 131 to 133 checks the owner of the application NFT 116, and checks whether an MFP that tries to activate and execute the application 101 is identical to an MFP being the owner of the application NFT 116. In a case where the MFP is not identical to the owner MFP, the activation and execution of the application 101 may be made inexecutable while the activation and execution of the application 101 can be performed in a case where the MFP is identical to the owner MFP. Accordingly, it is possible to prevent the improperly acquired application 101 from being executed. When the owner of the application NFT 116 is checked, an owner address included in a latest transaction within a latest block of the application NFT 116 is checked. Then, it is checked whether the address of the wallet registered in the MFP 131 that tries to execute the application 101 is identical to the owner address. The owner of the application NFT 116 can be thereby checked.

<Hardware Configuration of MFP>

Figure 4:
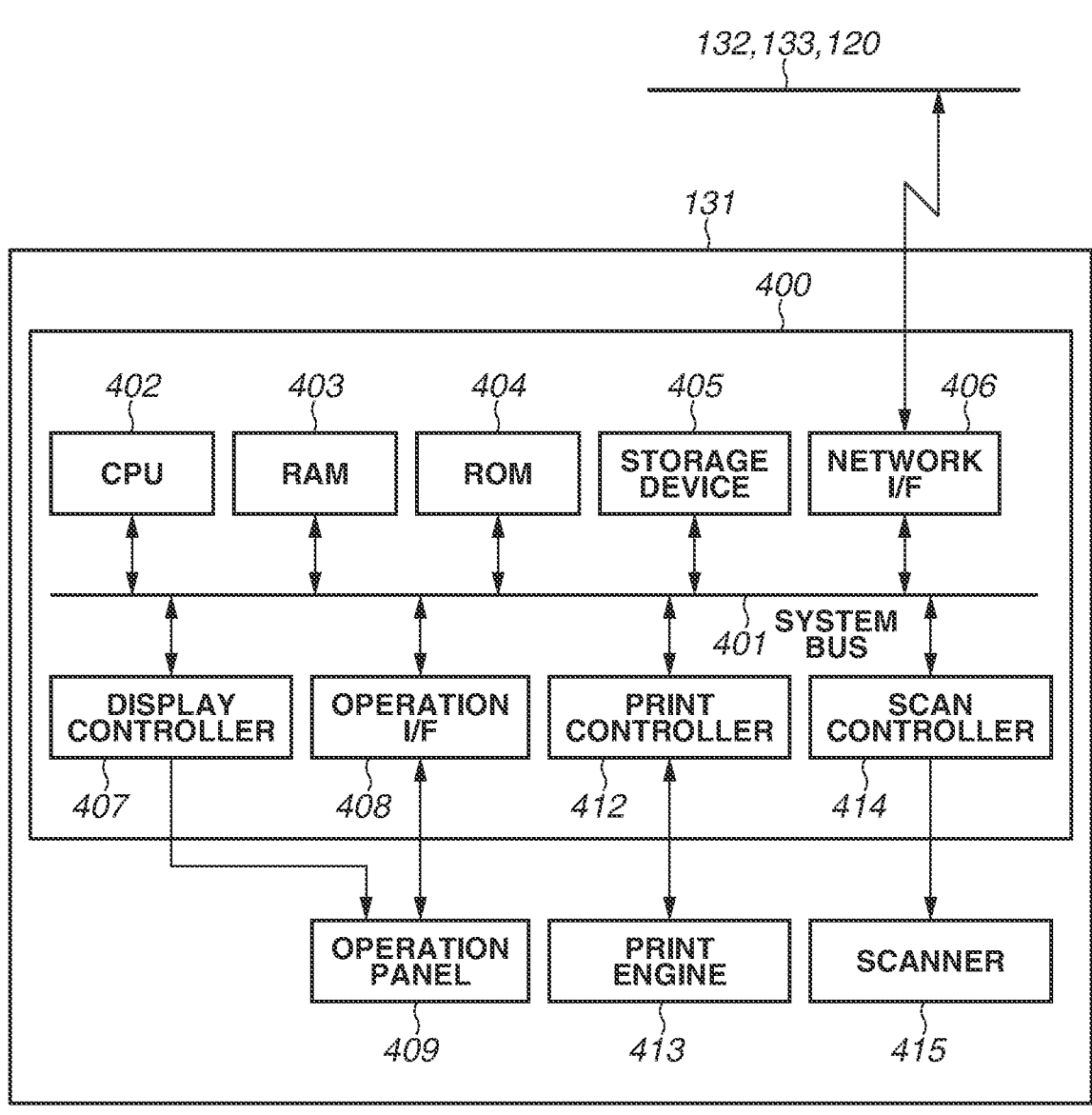
FIG. 4 is a diagram illustrating an example of a hardware configuration of an MFP.

FIG. 4 is a diagram illustrating an example of a hardware configuration of the MFP 131. Hereinafter, the hardware configuration of the MFP 131 will be described as an example, but the MFPs 132 and 133 have a similar configuration.

In a controller unit 400, the CPU 402, a random access memory (RAM) 403, a read-only memory (ROM) 404, and the storage device 405 are directly connected to a system bus 401. In addition, the controller unit 400 connects to an external device via a network interface (I/F) 406, a display controller 407, an operation I/F 408, a print controller 412, and a scan controller 414. These components are connected to the system bus 401, and communication can be performed with each other.

The CPU 402 is a central processing unit that controls operations of the entire controller unit 400. The RAM 403 is a volatile memory, and data loaded onto the RAM 403 is executed by the CPU 402. The ROM 404 is a nonvolatile memory, and stores an activation program.

The storage device 405 also serving as a storage unit is a large-volume storage device (for example, hard disc drive (HDD)) as compared with the RAM 403. The storage device 405 stores an MFP control program to be executed by the CPU 402, and an installed application. The storage device 405 may be replaced with another storage device having a function equivalent to that of an HDD, such as a solid state drive (SSD). The storage device 405 also stores information regarding a wallet of an MFP that accesses the blockchain 120, and stores an address of the wallet, a token amount (virtual currency), a secret key, a public key, and NFT information. The NFT information includes an NFT token (contract address and token ID) owned by the MFP. By using the owned NFT token, the metadata 331 of an NFT purchased using the function extension of the MFP is acquired from the blockchain 120, and main body data necessary for the function extension becomes acquirable. In a case where the NFT information is deleted or transferred from the wallet, entity data acquired based on the metadata 331 of the NFT is deleted from the storage device 405. Even if the entity data is not deleted, because the owner in the latest transaction has already been changed, the entity data cannot be used (for example, the CPU 402 cannot execute the application 101).

At the time of activation such as power-on, the CPU 402 executes an activation program stored in the ROM 404. This activation program is a program for reading out a control program stored in the storage device 405 and loading the control program onto the RAM 403. If the CPU 402 executes the activation program, the CPU 402 subsequently performs control by executing the control program loaded on the RAM 403. In addition, the CPU 402 also stores data to be used during execution of the control program into the RAM 403, and performs reading and writing of the data. The storage device 405 can further store various settings required during execution of the control program and image data generated by reading an image on a document using the scanner 415, and the CPU 402 reads and writes the various settings and image data from and to the storage device 405. The CPU 402 communicates with another device on a network via the network I/F 406, and communicates with the MP 110 on the Internet via a gateway. In the present exemplary embodiment, MFPs access the blockchain 120 via the MP 110, but the MFPs may directly access the blockchain 120 and transfer NFT data. The direct access to the blockchain 120 can be implemented by implementing RPC, such as NFT issuance or NFT transfer to the contract 301, in a control program of an MFP.

In accordance with an instruction from the CPU 402, the display controller 407 performs screen display of a touch panel on a connected operation panel 409.

The operation I/F 408 performs the input and output of an operation signal. The operation I/F 408 is connected to the operation panel 409. When a pressing operation is performed on a touch panel, the CPU 402 acquires coordinates of a position at which the pressing operation is performed on the touch panel, via the operation I/F 408, and detects an instruction on selection of a display object, such as a button. The above-described screens illustrated in FIGS. 2A to 2C are screens to be displayed on the operation panel 409 serving as an operation unit.

In accordance with an instruction from the CPU 402, the print controller 412 transmits a control command and image data to the connected print engine 413.

The print engine 413 is a printing unit, and prints the received image data onto a sheet in accordance with the control command received from the print controller 412.

In accordance with an instruction from the CPU 402, the scan controller 414 transmits a control command to the connected scanner 415, and writes image data received from the scanner 415 into the RAM 403.

The scanner 415 is a reading unit. In accordance with a control command received from the scan controller 414, the scanner 415 reads an image on a document on a platen glass (not illustrated) included in the MFP 131, using an optical unit. In addition, a document placed on a document tray included in the MFP 131 can be conveyed by a conveyance unit, and the scanner 415 can scan an image on the document.

In this case, the scanner 415 can also consecutively scan a plurality of documents.

Image data generated by reading an image on a document using the scanner 415 is stored in the RAM 403, converted by the CPU 402 into a file format such as a Portable Document Format (PDF), a Joint Photographic Experts Group (JPEG) format, or a Tag Image File Format (TIFF) in accordance with the setting of a file format, and is stored into the storage device 405.

<Flowchart of NFT Data Downloading>

Figure 5:
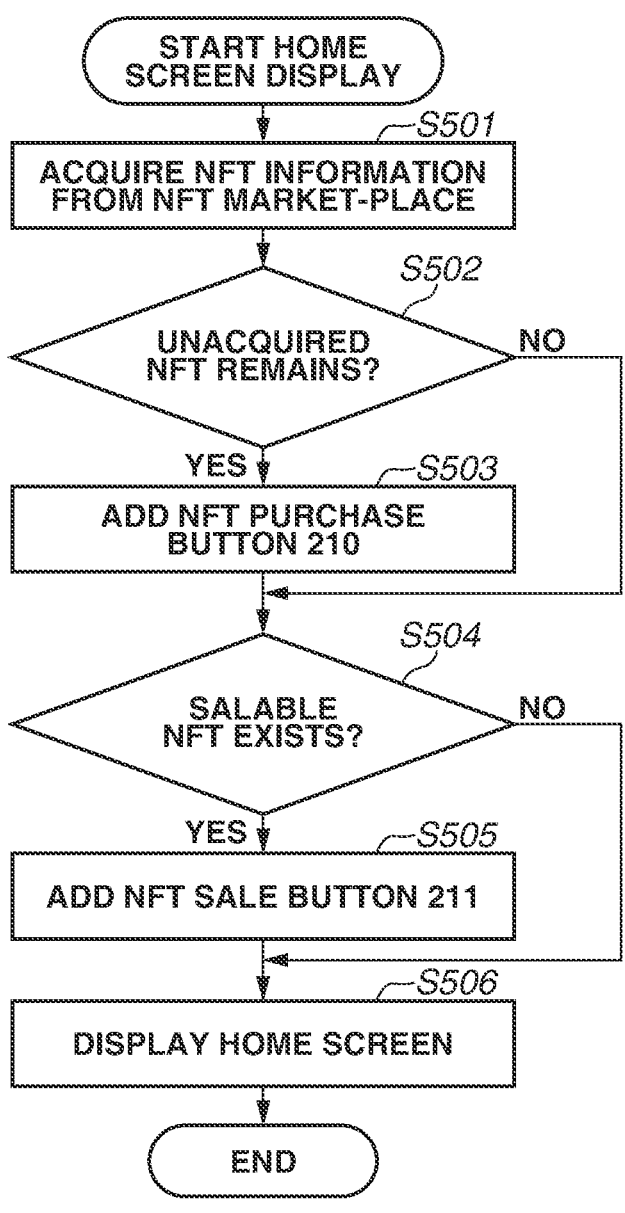
FIG. 5 is a flowchart illustrating an example of processing to be executed when a home screen is displayed.

FIG. 5 is a flowchart illustrating an example of processing to be executed when a home screen is displayed. The processing illustrated in the flowchart in FIG. 5 is started when the power of the MFP 131 is turned ON. In addition, a flow of processing illustrated in FIG. 5 is executed by the CPU 402 executing a program loaded on the RAM 403.

In step S501, the CPU 402 connects to the MP 110 by controlling the network I/F 406 using wallet information set in the storage device 405, and acquires NFT information released on the MP 110.

In step S502, the CPU 402 determines whether there is an unacquired NFT that is downloadable onto an MFP, based on the NFT information acquired from the MP 110 and NFT information stored in the storage device 405. In a case where there is an unacquired NFT that is downloadable onto an MFP (YES in step S502), the processing proceeds to step S503. In a case where there is no unacquired NFT that is downloadable onto an MFP (NO in step S502), the processing proceeds to step S504.

In step S503, the CPU 402 adds the NFT purchase button 210 as in the home screen 205 displayed on the operation panel 409.

In step S504, the CPU 402 determines whether a salable NFT exists, based on NFT information stored in the storage device 405. In a case where a salable NFT exists (YES in step S502), the processing proceeds to step S505. In a case where a salable NFT does not exist (NO in step S502), the processing proceeds to S506. In this step, whether a salable NFT exists may be determined based on whether NFT information is stored in the storage device 405. In a case where NFT information is not stored in the storage device 405, it is determined that a salable NFT does not exist. In a case where NFT information is stored in the storage device 405, it is determined that a salable NFT exists.

In step S505, the CPU 402 adds the NFT sale button 211 as in the home screen 205 displayed on the operation panel 409.

In step S506, the CPU 402 displays a home screen that is based on the determination of whether to add the NFT purchase button 210 and the NFT sale button 211, on the operation panel 409 under the control of the display controller 407.

Figure 6:
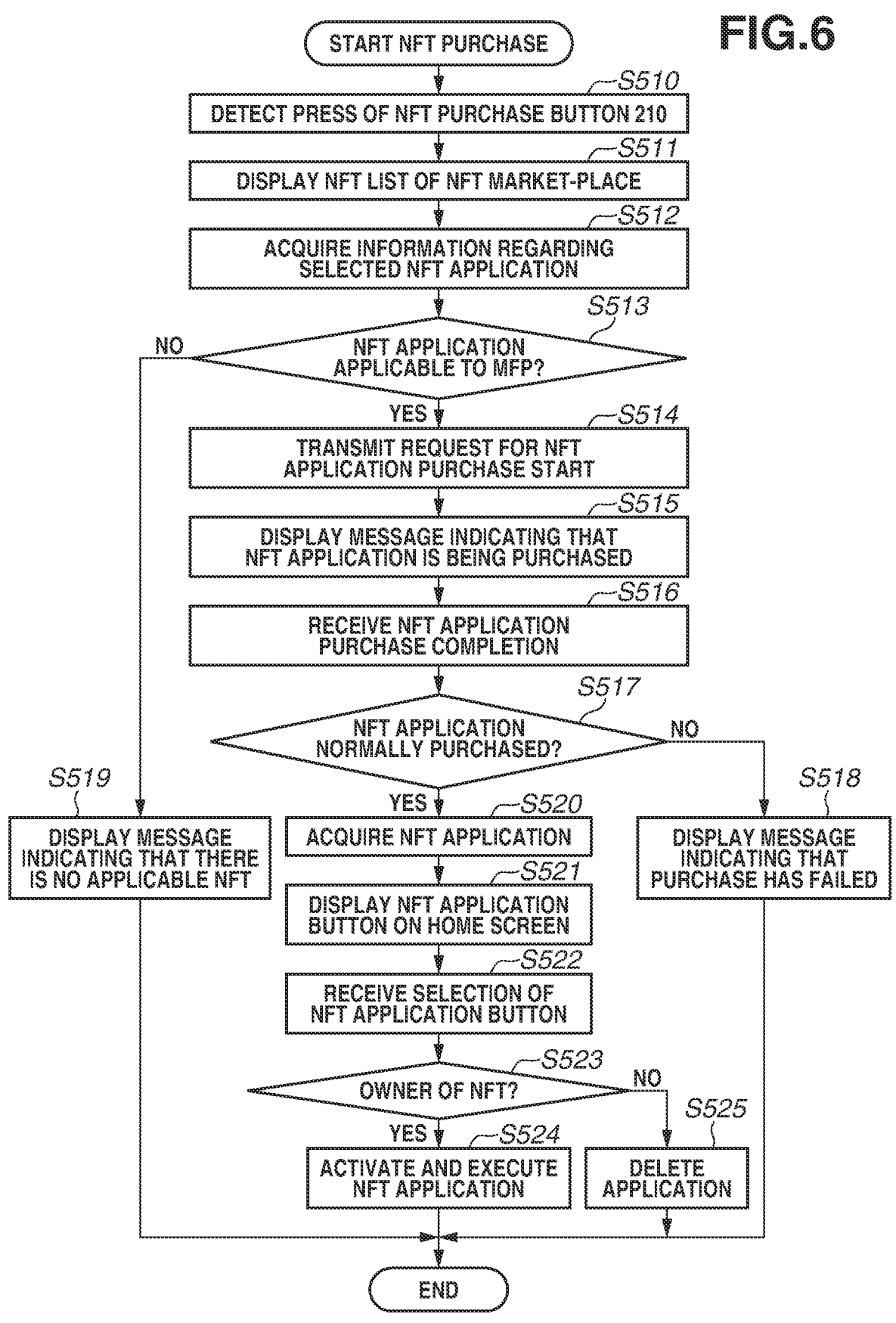
FIG. 6 is a flowchart illustrating an example of processing to be executed when an NFT purchase button is pressed and an application NFT is purchased.

FIG. 6 is a flowchart illustrating an example of processing to be executed when the NFT purchase button 210 is pressed and the application NFT 116 is purchased. In addition, a flow of processing illustrated in FIG. 6 is executed by the CPU 402 executing a program loaded on the RAM 403.

In step S510, the CPU 402 starts NFT purchase processing upon detecting the press of the NFT purchase button 210 on the operation panel 409 via the operation I/F 408.

In step S511, the CPU 402 connects to the MP 110 using wallet information of the MFP 131 that is stored in the storage device 405, acquires pieces of information regarding NFTs being for sale in the MP 110, and displays a list of NFTs on the operation panel 409.

In step S512, when the application NFT 116 is selected from the list, the CPU 402 connects to the MP 110, acquires detailed information of the application NFT 116, and displays the detailed information on the operation panel 409.

In step S513, the CPU 402 determines whether the application NFT 116 is applicable to the MFP 131, based on product information of the NFT, and determines whether the application NFT 116 is purchasable, based on a price of the application NFT 116 and a token amount (virtual currency) of the wallet. That is, the CPU 402 determines whether virtual currency equivalent to money necessary for the purchase of the application NFT 116 is included in the wallet of the MFP 131. In a case where the application NFT 116 is applicable and purchasable (YES in step S513), the processing proceeds to step S514. In a case where the application NFT 116 is inapplicable or unpurchasable (NO in step S513), the processing proceeds to step S519. An NFT inapplicable to the MFP 131 and an NFT unpurchasable by using virtual currency included in the wallet of the MFP 131 may be prevented from being displayed as a list. In the processing in step S513, an example in which whether the application NFT 116 is applicable to the MFP 131 and whether the application NFT 116 is purchasable are determined has been described, but the determination is not limited to this. For example, in step S513, only whether a selected NFT is purchasable by using virtual currency included in the wallet of the MFP 131 may be determined. In this case, an NFT inapplicable to the MFP 131 needs not be displayed in a list in the first place, or such an NFT may be displayed in an unselectable manner.

In step S514, the CPU 402 transmits, to the MP 110, a request for the purchase start processing 333 for purchasing the application NFT 116.

In step S515, the CPU 402 displays a message indicating that an application NFT is being purchased. During the NFT purchase, there exists a state of waiting for a block to be added to the blockchain 120 in the transaction related to the movement of an NFT owner and the exchange of a token amount. This waiting time for a block to be added to the blockchain 120 varies depending on the scale of the blockchain 120, a transaction amount, the number of nodes, and a consensus formation mechanism of the blockchain 120. Because the owner of an NFT is not changed until a transaction is added in the blockchain 120, by displaying a state that an application NFT is being purchased in the status display portion, the user of the MFP 131 can recognize that processing on the blockchain 120 is in execution.

In step S516, the CPU 402 receives, from the MP 110, information indicating purchase completion of the application NFT 116.

During a period from the start of purchase to the completion of purchase, the power of the MFP 131 may be turned OFF or network communication may be blocked. In this case, by checking NFT information of the application NFT 116 of the MP 110, the owner of the application NFT 116 can be confirmed. If an address of the wallet of the MFP 131 indicates the NFT owner of the application NFT 116, it can be confirmed that NFT purchase has succeeded. In addition, if the owner of the application NFT 116 remains a previous owner, it can also be confirmed that NFT purchase has failed.

In step S517, the CPU 402 determines whether the application NFT 116 has been normally purchased. In a case where the application NFT 116 has been purchased (YES in step S517), the processing proceeds to step S520. In a case where the application NFT 116 has not been purchased (NO in step S517), the processing proceeds to step S518.

In step S518, the CPU 402 displays a message indicating that the purchase of the application NFT 116 has failed, on the operation panel 409, and notifies the user of the failure. The message indicating that the purchase has failed may be displayed in the status display portion on the operation panel 409, and may be continuously displayed for a certain period of time.

In step S519, the CPU 402 displays, on the operation panel 409, a message indicating that an NFT applicable to the MFP 131 does not exist in the MP 110.

In step S520, the CPU 402 acquires NFT information of the application NFT 116 from the MP 110, and receives the application 101 which is an application included in the metadata 331 indicated by a token URI of the NFT information and serves as entity data of the application NFT 116.

In step S521, the CPU 402 displays, on the operation panel 409, the button 209 for activating the received application 101. The button 209 is a button for executing the application 101 as a predetermined application on the MFP 131, and is a button for receiving an execution instruction for executing the application 101.

In step S522, the CPU 402 receives the selection of the button 209 via the operation panel 409.

If the button 209 is selected, in step S523, the CPU 402 determines whether the owner of an NFT of the application corresponding to the selected button 209 is the MFP 131. In a case where it is determined that the MFP 131 is the owner (YES in step S523), the processing proceeds to step S524. In a case where it is determined that the MFP 131 is not the owner (NO in step S523), the processing proceeds to step S525.

For example, because the button 209 is selected in step S522, it is checked whether the address of the owner of the application NFT 116 that is NFT data of the application 101 is identical to the address of a wallet registered in the MFP 131. To check this, the CPU 402 accesses the blockchain 120 via a network, and acquires latest transaction data corresponding to the application NFT 116. Then, the CPU 402 determines whether an address included as information regarding the owner of an NFT included in the transaction data is identical to the address of the wallet stored in the storage device 405 of the MFP 131. Then, in a case where the addresses are identical to each other, it is determined that the MFP 131 is the owner, and in a case where it is determined that the addresses are not identical to each other, it is determined that the MFP 131 is not the owner. As an address of a wallet to be used in the determination as to whether addresses are identical to each other, an address of a wallet selected preliminarily or at the timing of step S523 from among a plurality of wallets pre-registered in the MFP

131 may be used. In a case where transaction data of an application corresponding to the selected button 209 cannot be acquired in step S523, or in a case where the transaction data does not exist, the processing may proceed to step S524 or the processing may proceed to step S525.

A method of checking an address of the owner will now be described. As shown in Table 1, transaction data includes information regarding a transmission source of an NFT indicated in "From", and information regarding a transmission destination indicated in "To". A wallet indicated by an address included in "To" in the latest transaction is the latest owner of a corresponding NFT. Thus, by checking whether an address indicated in "To" included in the acquired transaction data is identical to an address of a wallet prestored in the storage device 405, the CPU 402 can check that the MFP 131 is the owner of the corresponding NFT. The address of the wallet stored in the storage device 405 is set before shipment of the MFP 131, and may be configured not to be freely changed by the user, or may be configured to be set arbitrarily.

In the above-described example, the description has been given of a configuration example in which the MFP 131 directly acquires transaction data from a node of the blockchain 120, but the configuration is not limited to the example. For example, the MFP 131 may transmit a transaction data acquisition request to an information processing apparatus such as a server that provides the MP 110, and the server of the MP 110 may acquire transaction data from the blockchain 120 in response to the acquisition request. That is, the MFP 131 may acquire transaction data via a service of the MP 110. Then, the server of the MP 110 may transmit the acquired transaction data to the MFP 131.

In the above-described example, the description has been given of an example in which an address of a wallet is stored in the storage device 405 of the MFP 131, and the address is compared with an address indicating the owner of an NFT, but the configuration is not limited to the example. For example, the following configuration may be employed. An address of a wallet is stored in a storage device of a server that provides the MP 110, in association with an account of a service of the MP 110. Then, the MFP 131 transmits account information (authentication information such as a user ID and a password) about the service of the MP 110 to the MP 110, and the server of the MP 110 identifies an address of a wallet corresponding to the received account information. The MP 110 compares the identified address of the wallet and an address of an owner included in a transaction of an NFT corresponding to the acquisition request received from the MFP 131.

Because it has been confirmed that addresses are identical, in step S524, the CPU 402 activates and executes an application corresponding to the button 209 selected in step S522.

In step S525, the CPU 402 restricts the execution of the application in a case where the owner of an NFT has been changed or only application data is improperly acquired before the button 209 is selected after the button 209 is displayed. Specifically, even if the button 209 is selected, the CPU 402 makes no response. Then, the CPU 402 deletes the application 101 stored in the storage device 405. In addition to the deletion of the application 101, the CPU 402 may transmit information indicating that unauthorized use of the application 101 has been detected, to an apparatus of the distributor. With this configuration, the distributor of the application 101 can recognize that someone has tried to improperly use the application 101. In addition, before the button 209 is selected, the owner of an NFT corresponding to the button 209 may be checked, and based on the nonconformity between an address of the owner and the address of the wallet of the MFP 131, control may be performed in such a manner that the button 209 is not displayed. Alternatively, the button 209 may be displayed in a grayout state.

By executing such processing, in a case where an application is improperly downloaded, activation and execution of the application can be prevented. Also, in a case where data corresponding to an NFT is still stored even after the ownership of the NFT has been transferred, activation and execution of the application can be prevented.

Figure 7:
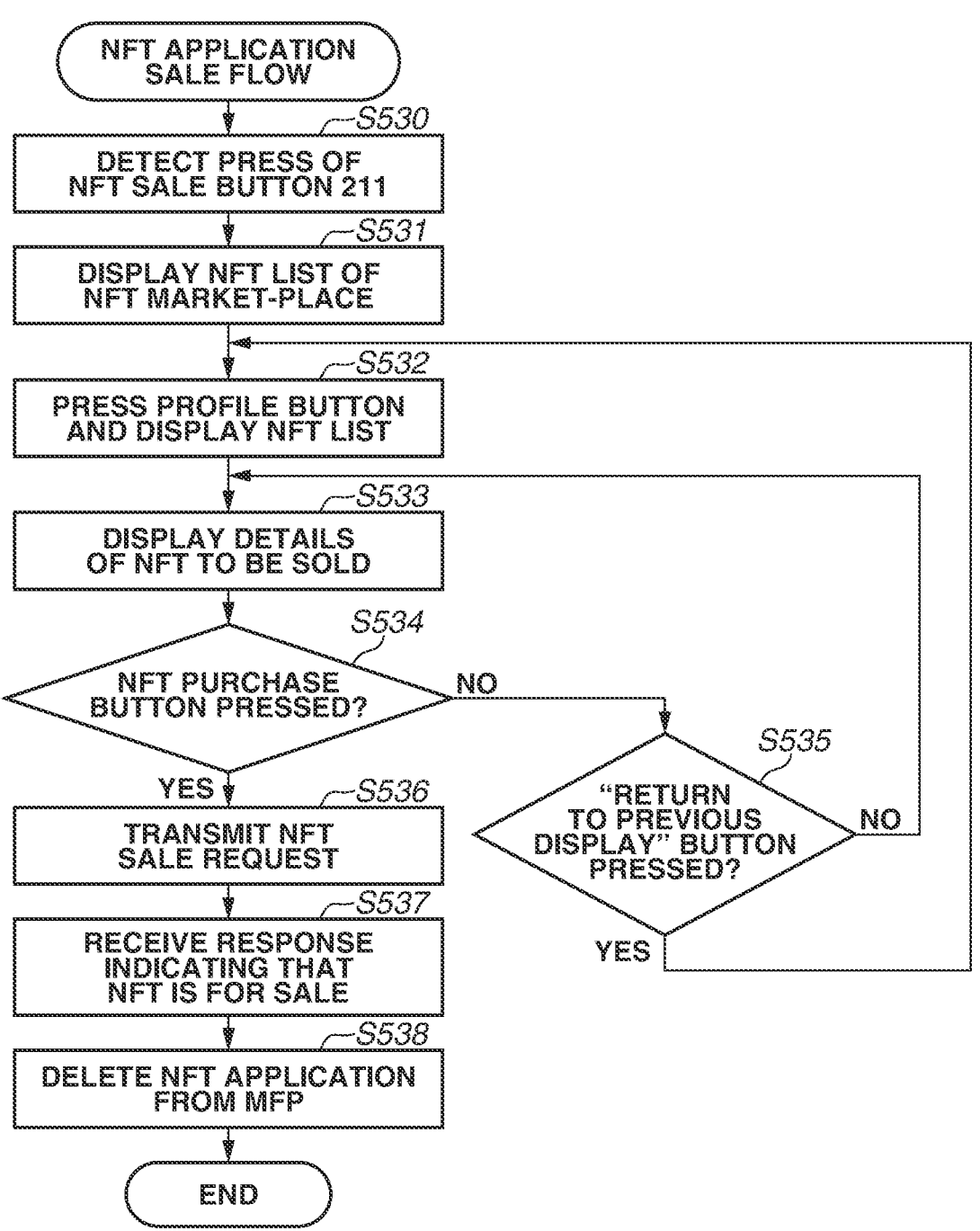
FIG. 7 is a flowchart illustrating an example of processing to be executed when an NFT sale button is pressed and an application NFT is sold.

FIG. 7 is a flowchart illustrating an example of processing to be executed when the NFT sale button 211 is pressed and the application NFT 116 is sold.

In step S530, the CPU 402 starts NFT sale processing upon detecting the press of the NFT sale button 211 on the operation panel 409 via the operation I/F 408.

In step S531, the CPU 402 connects to the MP 110 by controlling the network I/F 406 using wallet information set in the storage device 405, and reads out NFT information released on the MP 110.

In step S532, the CPU 402 detects depression of a profile button 717 of the MP 110, and displays an NFT list owned by a wallet of the MFP 131.

In step S533, the CPU 402 selects the application NFT 116, and displays an NFT detailed display screen.

In step S534, the CPU 402 determines whether the press of an NFT sale button 723 has been detected. In a case where the press of the NFT sale button 723 has been detected (YES in step S534), the processing proceeds to step S536. In a case where the press of the NFT sale button 723 has not been detected (NO in step S534), the processing proceeds to step S535.

In step S535, the CPU 402 determines whether the selection of a "return to previous display" button 724 has been detected. In a case where the selection of the "return to previous display" button 724 has been detected (YES in step S535), the processing returns to step S532. In a case where the selection of the "return to previous display" button 724 has not been detected (NO in step S535), the processing returns to step S533.

In step S536, to change an NFT sale attribute of the application NFT 116 from "not for sale" to "for sale", the CPU 402 transmits a request for executing NFT sale start processing for the application NFT 116 to the MP 110, and displays a message indicating that the NFT is for sale in the status display portion of the operation panel 409.

In step S537, the CPU 402 receives the for-sale response 326 regarding the application NFT 116 from the MP 110.

In step S538, the CPU 402 deletes the application NFT 116 from wallet information of the MFP 131, and also deletes the application 101 that is entity data of the application NFT 116 from the storage device 405.

As described above with reference to the flowcharts in FIGS. 5, 6, and 7, in a case where the application 101 is downloaded or installed onto the MFP 131, the application NFT 116 displayed on the MP 110 needs to be purchased. In addition, when the application NFT 116 is purchased, there is a waiting time before a block is added to the blockchain 120. Thus, during the waiting state, a purchasing state is displayed in the status display portion of the MFP 131 so that the user is clearly informed that the current state is the state of waiting for addition to the blockchain 120, and immediate use cannot be made. Further, when the purchased application NFT 116 is to be sold, the application 101 is deleted from MFP 131, so that unauthorized use of the application 101 can be prevented. In a case where an unpurchased application NFT 116 is stored in the storage device 405 of the MFP 131, a message indicating that the address of the owner of the application NFT 116 of the MP 110 is different from the address of the wallet of the MFP 131 may be displayed. This can prohibit the execution of the application 101.

Thus, it is possible to restrict processing on data acquired by an information processing apparatus using an unauthorized method, and prevent unauthorized use of data.

<Hardware Configuration of Market-Place>

Figure 8:
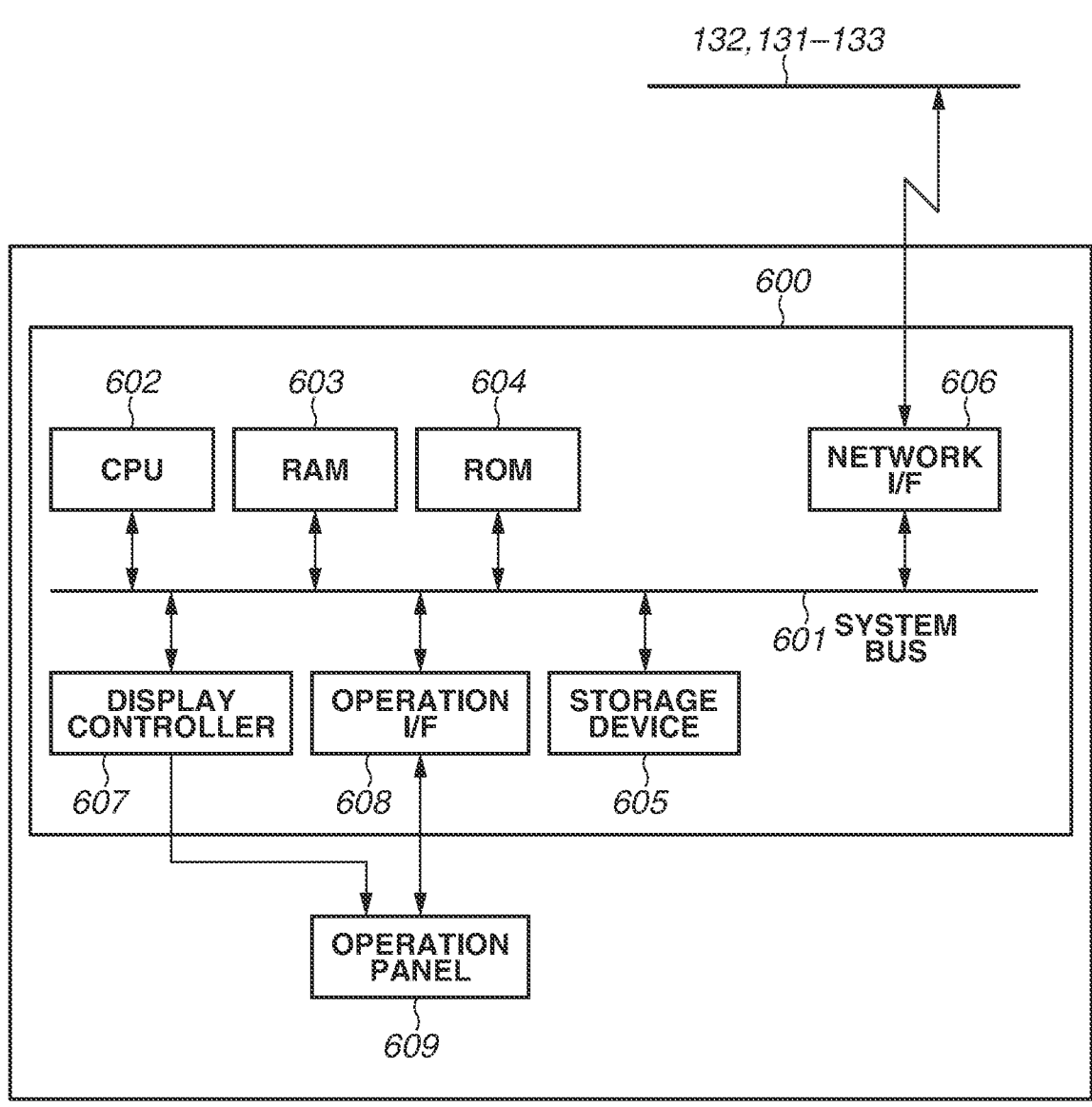
FIG. 8 is a diagram illustrating an example of a hardware configuration of an information processing apparatus that provides a market-place (MP)

FIG. 8 is a diagram illustrating an example of a hardware configuration of an information processing apparatus that provides the MP 110. Similarly to the blockchain 120, the MP 110 also arranges servers on a blockchain in a distributed manner via P2P communication therebetween. For ease of description, a hardware configuration of a server arranged in such a manner that the MP 110 and the MFPs 131 to 133 communicate via a web application will be described.

A controller unit 600 includes a CPU 602, a RAM 603, a ROM 604, a storage device 605, a network I/F 606, a display controller 607, and an operation I/F 608 that are connected to a system bus 601. The display controller 607 and the operation I/F 608 connect to an operation panel 609, and controls an operation on a button on the operation panel 609 that is to be performed by the user, and controls the update of screen display on the operation panel 609.

The CPU 602 is a central processing unit that controls operations of the entire controller unit 600. The RAM 603 is a volatile memory. The ROM 604 is a nonvolatile memory, and stores an activation program of the CPU 602.

The storage device 605 is a large-volume storage device (for example, HDD or SSD) as compared with the RAM 603. The storage device 605 stores a control program, an application, and various types of data. The CPU 602 executes the activation program stored in the ROM 604, when activating an information processing apparatus. This activation program is a program for reading out a control program stored in the storage device 605, and loading the control program onto the RAM 603. If the CPU 602 executes the activation program, the CPU 602 subsequently executes the control program loaded on the RAM 603. In addition, the CPU 602 also stores data to be used during execution of the control program into the RAM 603, and performs reading and writing of the data. The storage device 605 can further store various settings required during execution of the control program. The CPU 602 reads and writes the various settings from and to the storage device 605. The CPU 602 communicates with another device on the network via the network I/F 606, and communicates with the blockchain 120 and the MFPs 131 to 133 on the Internet via the gateway.

In accordance with an instruction from the CPU 602, the display controller 607 performs screen display control of the connected operation panel 609. The operation I/F 608 performs the input and output of an operation signal from operation panel 609.

As described above, an information processing apparatus that provides the MP 110 in the present exemplary embodiment may be a generally available apparatus that provides a web service as a server function. A web service provided by the MP 110 executes processing designated by a web application accessed from the MFPs 131 to 133 and the web application via RPC communication with the blockchain 120.

<Market-Place Screen Flow>

Figure 9:
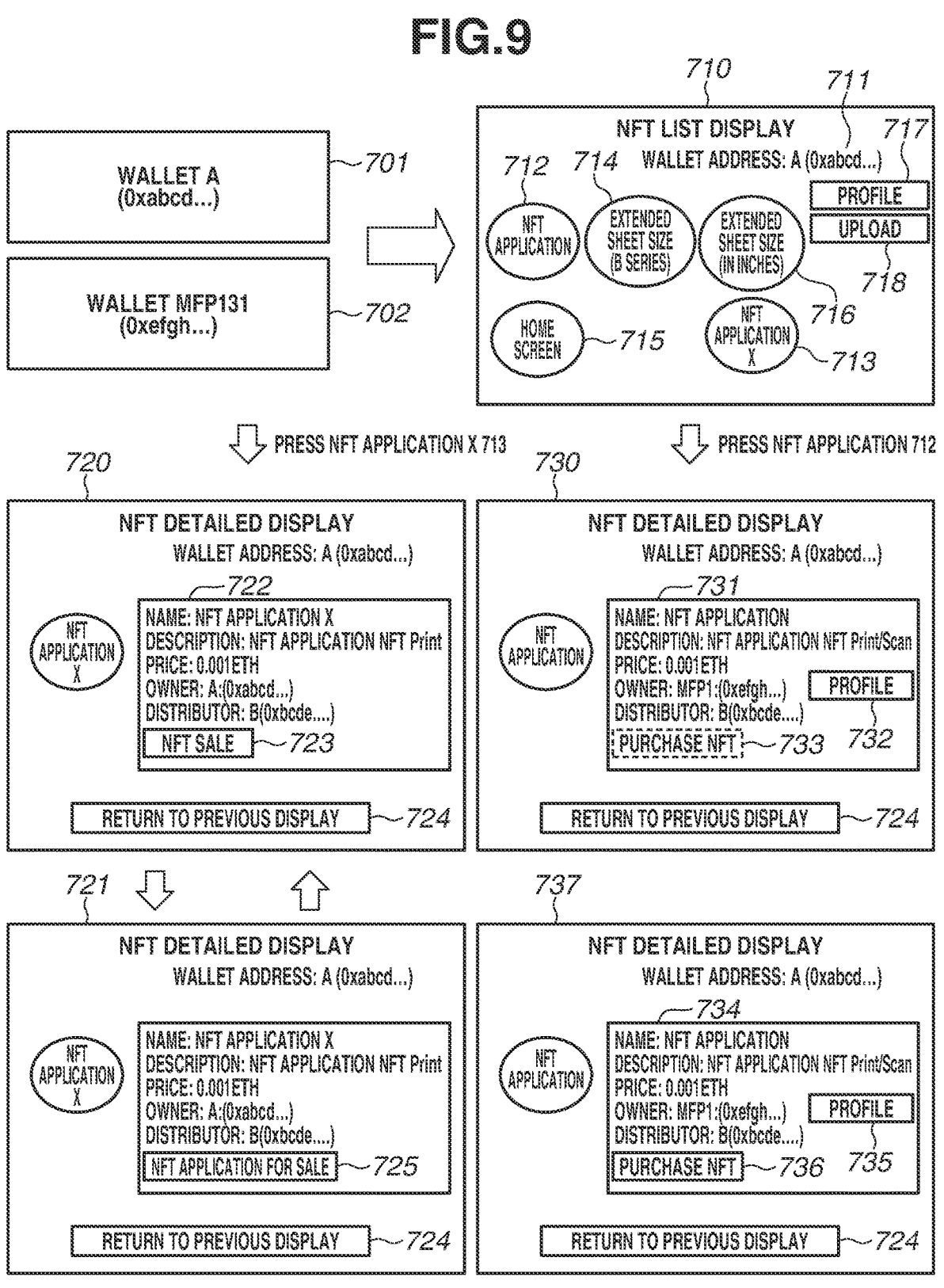
FIG. 9 is a diagram illustrating screen transition to a screen displaying the details of an NFT from a wallet to be displayed when the MP is referred to and a screen displaying an NFT list of the MP.
Figure 10:
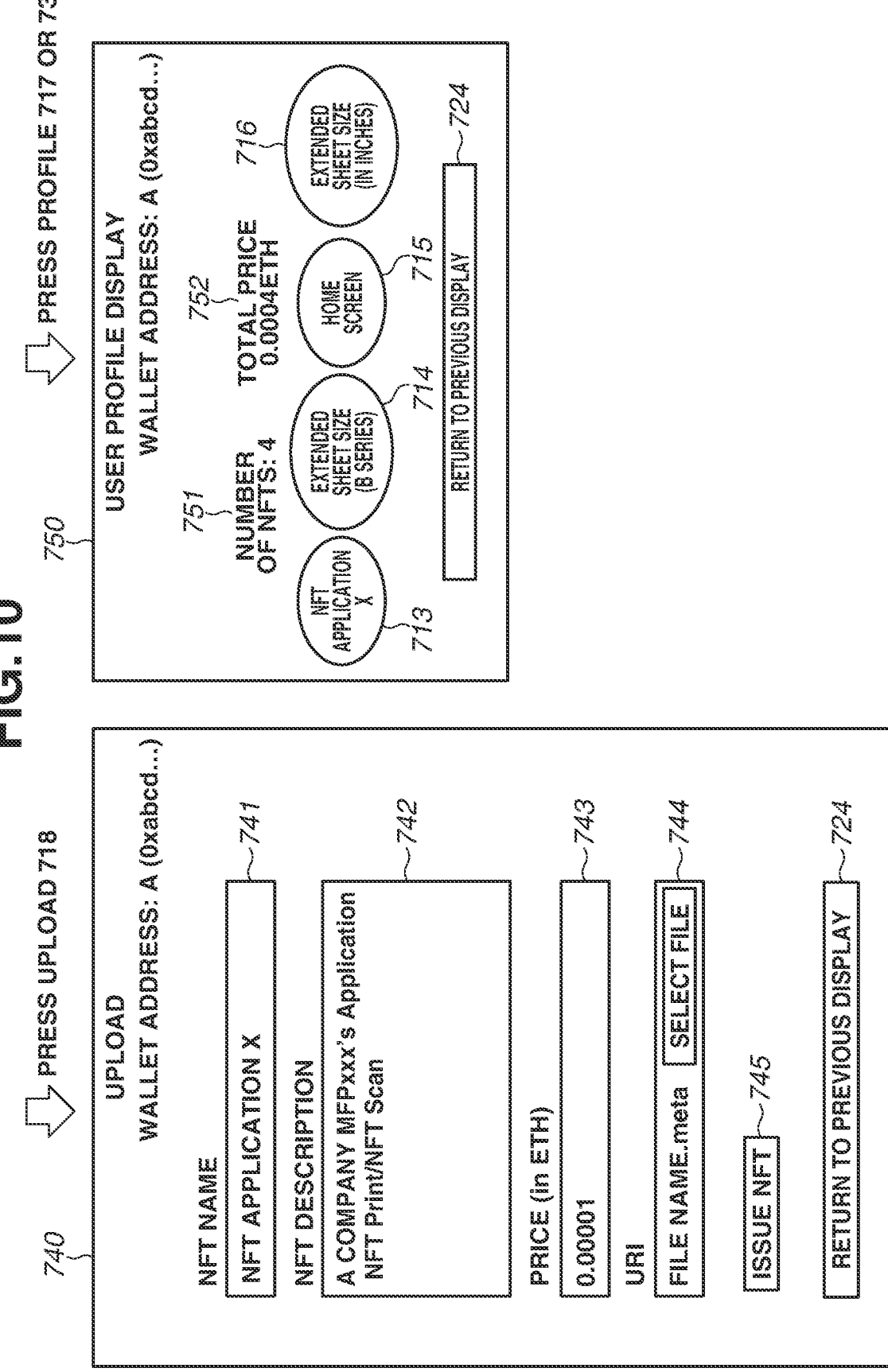
FIG. 10 is a diagram illustrating examples of an upload screen and a profile screen.

FIGS. 9 and 10 illustrate an example of the transition of screens to be displayed on a browser to be accessed by a web application provided by the MP 110. The MP 110 provides a web service for issuing, selling, and purchasing NFTs, and communicates with the blockchain 120 using information regarding a wallet of a communication partner to perform the issuance of an NFT, the transfer of an NFT, the deletion of an NFT, the display of NFT information, and the change of NFT information.

FIG. 9 is a diagram illustrating screen transition to a screen displaying the details of an NFT from wallets to be displayed when the MP 110 is referred to and a screen displaying an NFT list of the MP 110.

A wallet 701 is a wallet owned by a company (may be an individual) that issues and sells an NFT. The MP 110 manages an NFT such that the owner of a wallet is identical to a (wallet) address. The wallet 701 is a wallet owned by the NFT issuer 300 in FIG. 3 (denoted by "A" in FIG. 9).

A wallet 702 is a wallet of the MFP 131. On the MFP 131, the user creates a wallet, and the MFP 131 connects to the MP 110 using wallet information stored in the storage device 405.

An NFT list display screen 710 is a screen including an NFT list to be displayed after the MFP 131 connects to the MP 110 using the wallet 701. This screen is displayed on the operation panel 409. This NFT list display screen 710 is displayed when the NFT sale button 211 or the NFT purchase button 210 in FIGS. 2A to 2C is selected. Alternatively, an MP button (not illustrated) may be displayed on the home screen 205, and when the MP button is selected, the MFP 131 may access the MP 110, and the NFT list display screen 710 may be displayed.

A wallet address 711 displays the address of the wallet 701 used in the connection to the MP 110 (the address of the wallet of the MFP 131). The displayed address is used as an address of the owner of an NFT, or a destination to be set at the time of transfer.

An application NFT button 712 is a display example of the application NFT 116 on the MP 110. On the NFT list display screen 710, the application NFT button 712 is indicated by a simple round button. Alternatively, image data (https://ipfs/application101.jpg) included in NFT information of the application NFT 116 may be displayed. By clicking the application NFT button 712, an NFT detailed display screen 730 of the application NFT 116 is displayed.

An application NFTX button 713 indicates an application NFTX (not illustrated). An extended sheet size (B series) button 714 is a display example of the extended sheet size (B series) NFT 114 on the MP 110. A home screen button 715 is a display example of the home screen NFT 115 on the MP 110.

An extended sheet size (in inches) button 716 is a display example of the extended sheet size (in inches) NFT 118 on the MP 110. The profile button 717 is a button for displaying NFT information owned by the wallet address 711. A screen to be displayed when the profile button 717 is pressed on the browser will be described with reference to FIG. 10.

An upload button 718 is a button for issuing an NFT of which the owner is set to an owner indicated by the wallet address 711. A screen to be displayed when the upload button 718 is pressed on the browser will be described with reference to FIG. 10.

An NFT detailed display screen 720 is a screen displaying NFT information of the application NFTX that is to be displayed when the application NFTX button 713 is pressed, and NFT information regarding the application NFTX is displayed in a region 722.

The NFT information of the application NFTX is shown in Table 2 given below.

TABLE 2

| NFT information of application NFTX | |
| --- | --- |
| Name | Application NFTX |
| Description | Application NFTX NFTPrint |
| Price | 0.001ETH (virtual currency) |
| Owner | Wallet address of owner A |
| Distributor | Wallet address of payment recipient B |
| Sale attribute | For sale or not for sale |

Aside from this, a percentage with respect to a price for paying a royalty to a distributor, a state of an NFT in a blockchain, transaction information, a contract address, and a token URI indicating the location of the metadata 331 are included as the NFT information.

The NFT sale button 723 is a button for changing a sale attribute of an NFT to "for sale". The NFT sale button 723 is displayed in a case where a wallet address of the MFP 131 and a wallet address recorded as an address of the owner of NFT information are the same. If the NFT sale button 723 is selected, the NFT detailed display screen 720 transitions to an NFT detailed display screen 721, and the NFT sale button 723 is switched to an NFT for sale button 725.

The "return to previous display" button 724 is a button for returning to the NFT list display screen 710.

The NFT detailed display screen 721 is an NFT detailed display screen displaying an NFT owned by the owner of the NFT when a sale attribute of the NFT is switched to "for sale". If the NFT for sale button 725 is pressed, the NFT detailed display screen 721 transitions to the NFT detailed display screen 720, and the NFT for sale button 725 is switched to the NFT sale button 723.

In this manner, with the configuration in which a sale attribute of NFT information is changeable on the NFT detailed display screens 720 and 721 displaying NFT information of the MP 110, it is possible to easily sell an NFT.

The NFT detailed display screen 730 is displayed when the application NFT button 712 is selected, and displays NFT information regarding the application NFT.

Because NFT information similar to that of the application NFTX is displayed in a region 731, in the following description of the NFT detailed display screens 730 and 737, only a difference from the NFT detailed display screens 720 and 721 will be described.

A profile button 732 is a button prepared for displaying a profile of a wallet address because a wallet address of the owner is different from a wallet address A (address of wallet of the MFP 131) used when connection to the MP 110 is established. In a case where the profile button 717 is selected, a screen including profile information of a wallet used when connection to the MP 110 is established is displayed on the operation panel 409. In a case where the profile button 732 is selected, a screen including profile information of a wallet of which the owner is the owner of an NFT corresponding to the application NFT button 712 is displayed on the operation panel 409. In the example of the NFT detailed display screen 730, profile information of a wallet indicated by the wallet address (MFP1: 0xefgh . . . ) is displayed. A screen on which profile information of a wallet is displayed will be described with reference to FIG. 10.

An NFT purchase button 733 is displayed when an NFT owner sets a sale attribute of NFT information to "not for sale". Even if the NFT purchase button 733 is pressed, no response is made. The NFT purchase button 733 is represented by a dotted line to indicate that the application NFT cannot be purchased.

The NFT purchase button 736 displayed on the NFT detailed display screen 737 is displayed when an NFT owner sets a sale attribute of NFT information to "for sale". When the NFT purchase button 736 is selected, purchase processing of the application NFT can be started. Specifically, when the NFT purchase button 736 is selected, the processing in step S514 of FIG. 6 can be started.

In this manner, by displaying NFT purchase in an enabled state or a disabled state on the NFT detailed display screens 730 and 737 of the MP 110 in accordance with the sale attribute of NFT information, the user can easily check whether an NFT can be purchased.

FIG. 10 is a diagram illustrating examples of an upload screen 740 and a profile screen 750.

The upload screen 740 is a screen to be displayed on the operation panel 409 when the upload button 718 is selected, and the upload screen 740 is a screen for executing an upload function. This upload function is a function for making an application stored in the MFP 131 into an NFT, and uploading the NFT to the MP 110.

A name of an NFT to be uploaded to the MP 110 can be entered into a text box 741.

The description of the NFT to be uploaded to the MP 110 can be entered into a text box 742.

A text box 743 is a numerical entry box into which a price of the NFT to be uploaded to the MP 110 is entered.

A selection box 744 is a selection box into which a URI of the metadata 331 of the NFT to be uploaded to the MP 110 is entered. In the present exemplary embodiment, if a file selection button is pressed, a URI is made settable while referring to the URI indicating the metadata 331 of the NFT.

An NFT issuance button 745 is a button for executing issuance processing for an NFT of a file indicated by the URI set in the selection box 744, on the MP 110. If the NFT issuance button 745 is selected, a transaction for issuing the NFT is generated, and a request to add the transaction to the blockchain 120 is made. Whether the addition has succeeded or failed after the addition request is executed can be checked based on whether the entered NFT is displayed in the NFT list display. The state in which the NFT is being added may be represented by, for example, disabling the corresponding button on the NFT list display.

The "return to previous display" button 724 is a button for returning to a screen displayed before the upload button 718 is pressed.

The profile screen 750 is a screen to be displayed when the profile button 717 or 732 is selected, and the profile screen 750 is a screen for displaying a profile of a corresponding wallet.

The number of NFTs of which owners are set to the owner of a wallet corresponding to the selected profile button 717 or 732 is displayed in a region 751.

A total price of NFTs owned by the wallet corresponding to the selected profile button 717 or 732 is displayed in a region 752.

Buttons 713 to 716 are the same as the buttons displayed on the NET list display screen 710. As described above, through a screen flow illustrated in FIGS. 9 and 10, operations for issuing, selling, and purchasing an NFT on the MP 110 are performed.

<Flowchart of Processing to be Executed when NFT Market-Place is Accessed>

Figure 11:
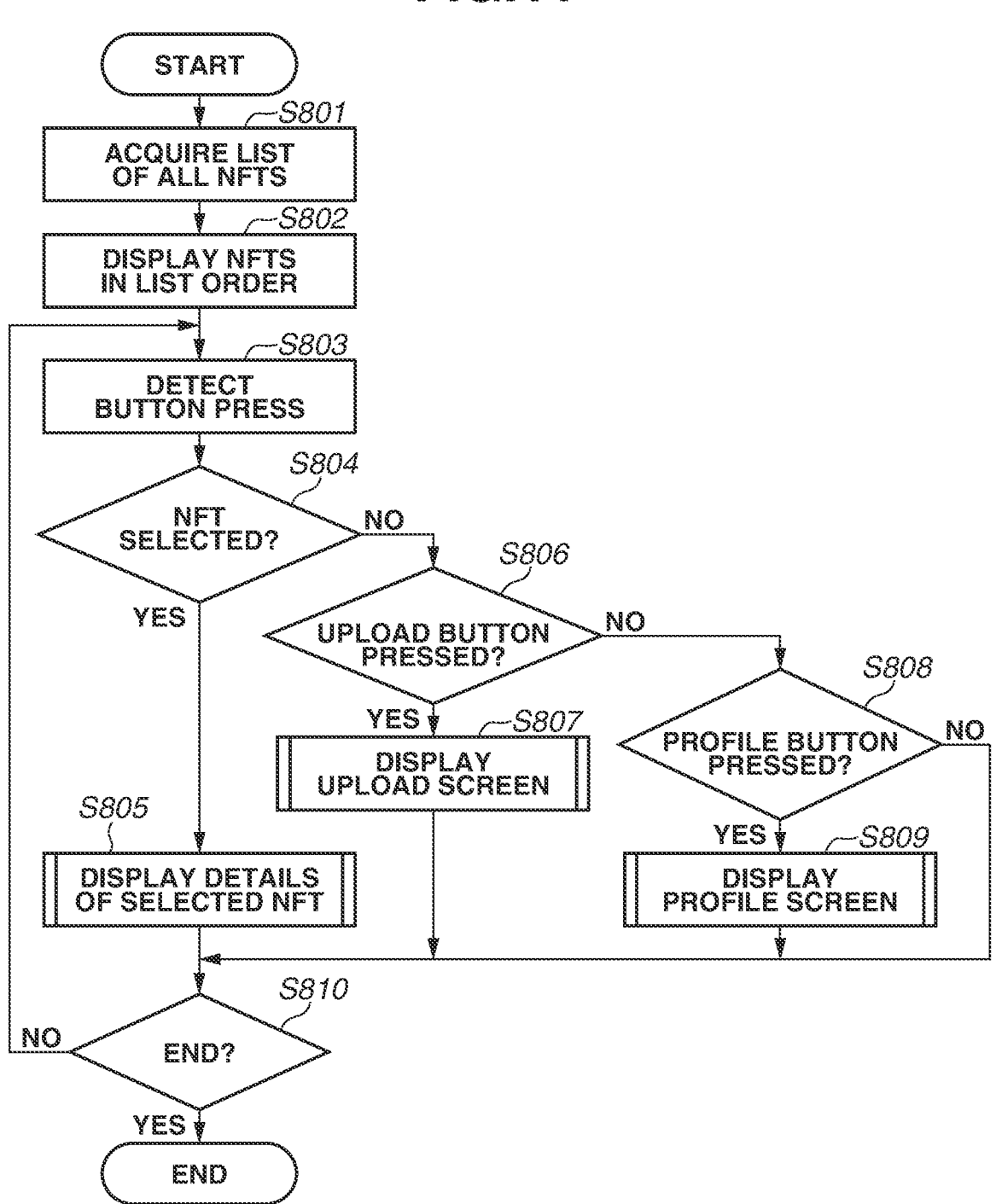
FIG. 11 is a flowchart illustrating an example of processing to be executed when the MFP accesses the MP.

FIG. 11 is a flowchart illustrating an example of processing to be executed when the MFP 131 accesses the MP 110. A flow of processing illustrated in FIG. 11 is started when the NFT purchase button 210, the NFT sale button 211, or the MP button (not illustrated) is selected.

The MP 110 starts the control of a web service for a communication partner connected using a wallet. In the web service, a function of a web server for executing sale/purchase of an NFT by making access using a wallet is executed at the front end. In addition, control for adding a transaction to the blockchain 120 is also executed. In this manner, because control like the web server is performed in the web service, a screen to be displayed when accessing the MP 110 is a screen to be displayed by a browser installed on the MFP 131 based on received HTML data. That is, the information processing apparatus that provides the MP 110 functions as a web server, and the screens illustrated in FIGS. 9 and 10 are displayed when the MFP 131 receives HTML data from the information processing apparatus. Specifically, pressing of a button means that information regarding the press of an HTML button is received in the HTML or JavaScript on the browser that is referred to. Hereinafter, the reception of information regarding the press of a button will be described by replacing the phrase with the expression "press a button".

In step S801, the CPU 602 calls out a list of all NFTs managed on the MP 110 from the storage device 605 and acquires the list. An NFT list is obtained by listing all NFTs issued on the MP 110 and is managed in the storage device 605. Alternatively, an NFT management contract (not illustrated) may be created in the blockchain 120 for a marketplace, and a list may be prepared in the contract.

In step S802, the CPU 602 displays the NFT list display screen 710 based on the NFT list.

In step S803, the CPU 602 detects a button pressed on the NFT list display screen 710.

In step S804, the CPU 602 determines whether one of the NFTs displayed on the NFT list display screen 710 has been pressed. In a case where one of the NFTs has been pressed (YES in step S804), the processing proceeds to step S805. In a case where any of the NFTs has not been pressed (NO in step S804), the processing proceeds to step S806.

In step S805, the CPU 602 generates the NFT detailed display screen 720, 721, 730, or 737 for the selected NFT. The display of the NFT detailed display screens will be described with reference to FIG. 12.

In step S806, the CPU 602 determines whether the upload button 718 on the NFT list display screen 710 has been pressed. In a case where the upload button 718 has been pressed (YES in step S806), the processing proceeds to step S807. In a case where the upload button 718 has not been pressed (NO in step S806), the processing proceeds to step S808.

In step S807, the CPU 602 displays the upload screen 740. The display of the upload screen 740 will be described with reference to FIG. 13.

In step S808, the CPU 602 determines whether the profile button 717 has been pressed. In a case where the profile button 717 has been pressed (YES in step S808), the processing proceeds to step S809. In a case where the profile button 717 has not been pressed (NO in step S808), the processing proceeds to step S810.

In step S809, the CPU 602 displays the profile screen 750. The display of the profile screen 750 will be described with reference to FIG. 14.

In step S810, the CPU 602 determines whether to end the display of the NFT list. In a case where the display of the NFT list is not to be ended (NO in step S810), the processing returns to step S803. In a case where NFT list display is to be ended (YES in step S810), the MP 110 ends communication with the MFP 131.

Figure 12:
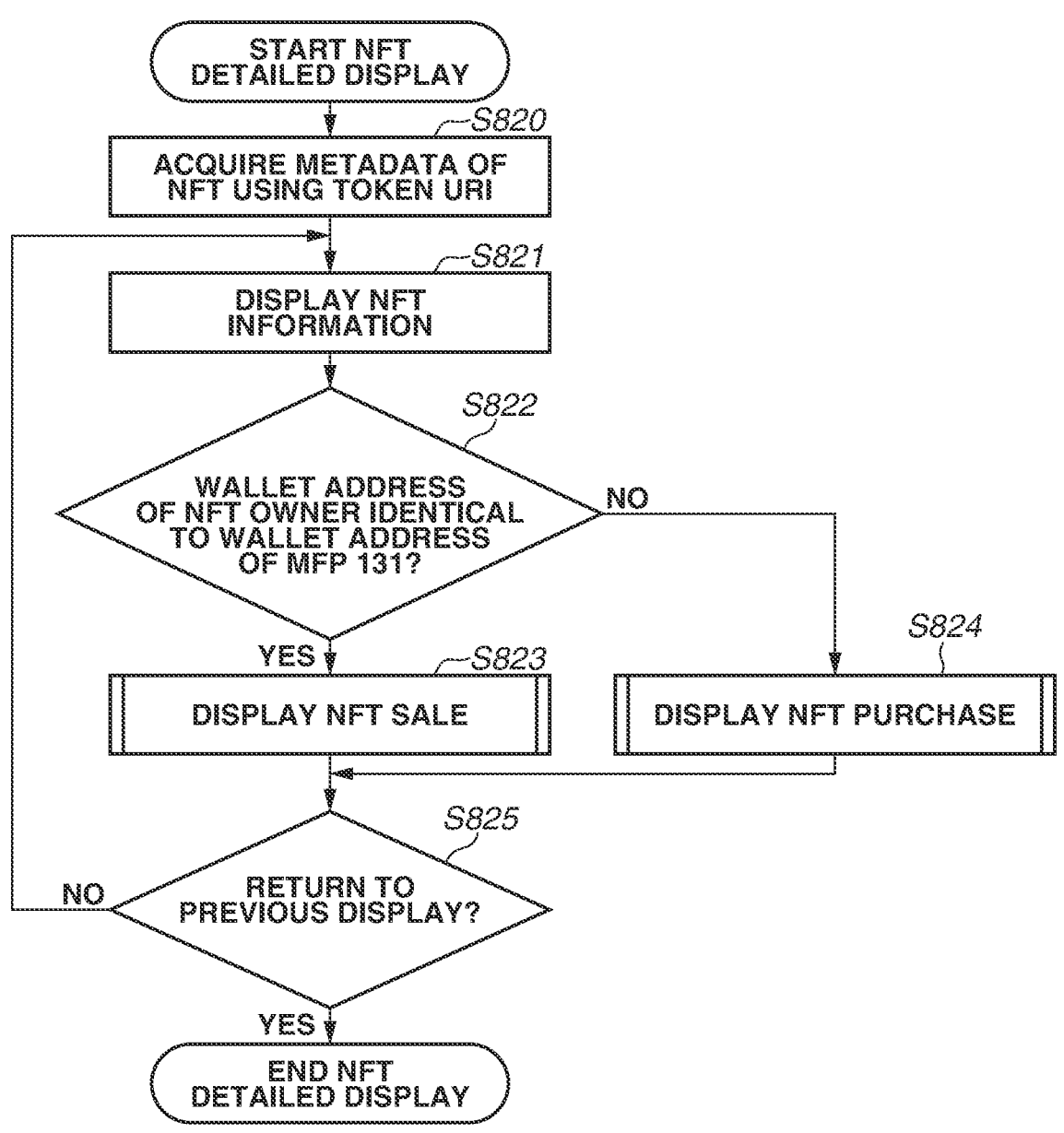
FIG. 12 is a flowchart illustrating an example of processing to be executed when detailed information of a selected NFT is to be displayed.

FIG. 12 is a flowchart illustrating an example of processing to be executed when detailed information of a selected NFT is to be displayed.

In step S820, the CPU 602 acquires NFT information and the metadata 331 of the selected NFT. Using the contract address 303 and a token ID of the NFT, the NFT information is acquired from the last (latest) transaction block registered in the blockchain 120 by making an inquiry to the blockchain 120 using RPC.

In step S821, the CPU 602 displays the acquired NFT information (name, description, owner, distributor) as in the NFT detailed display screen 720, 721, 730, or 737.

In step S822, the CPU 602 determines whether a displayed wallet address indicating the owner of the NFT is identical to a wallet address of the MFP 131 connecting to the MP 110. In a case where the wallet addresses are identical to each other (YES in step S822), the processing proceeds to step S823. In a case where the wallet addresses are different from each other (NO in step S822), the processing proceeds to step S824.

In step S823, the CPU 602 performs display control of the NFT detailed display screen 720 or 721 for NFT sale based on a sale attribute. A flowchart that is based on the display control of an NFT sale will be described with reference to FIG. 15.

In step S824, the CPU 602 performs display control of the NFT detailed display screen 730 or 737 for NFT purchase based on a sale attribute. A flowchart that is based on the display control of an NFT purchase will be described with reference to FIG. 16.

In step S825, the CPU 602 determines whether the press of the "return to previous display" button 724 has been detected. In a case where the press of the "return to previous display" button 724 has been detected (YES in step S825), the CPU 602 ends NFT detailed display. In a case where the press of the "return to previous display" button 724 has not been detected (NO in step S825), the processing returns to step S821.

Figure 13:
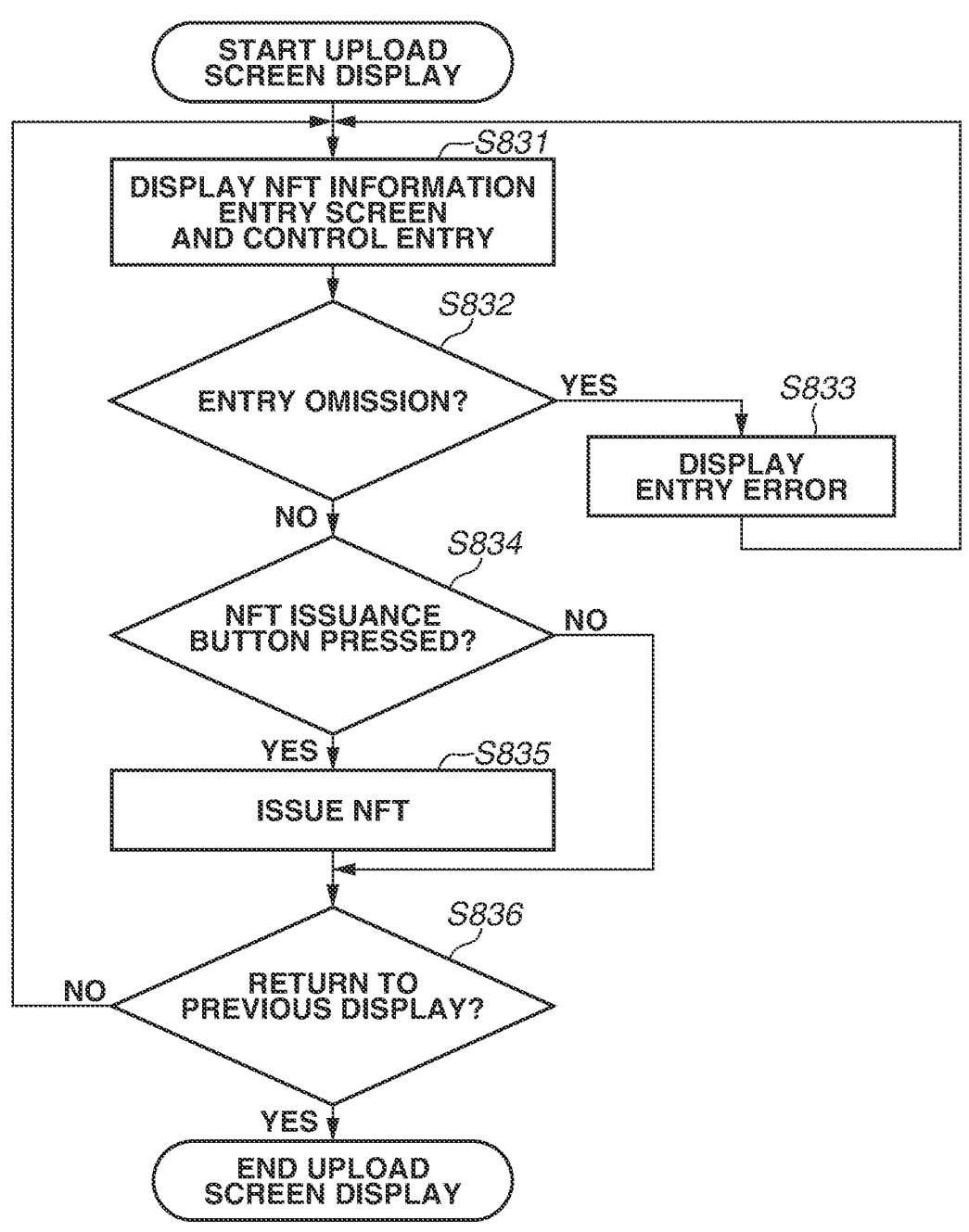
FIG. 13 is a flowchart illustrating an example of processing to be executed on the upload screen by an upload button being selected.

FIG. 13 is a flowchart illustrating an example of processing to be executed on the upload screen 740, which is displayed when the upload button 718 is selected.

In step S831, the CPU 602 displays a wallet address of the MFP 131 connecting to the MP 110, displays an NFT information entry screen, and detects pressing of a button. Then, the text boxes 741 to 743, the selection box 744, and the NFT issuance button 745 are displayed.

In step S832, the CPU 602 determines whether there is entry omission in the text boxes 741 to 743 and the selection box 744. In a case where there is entry omission (YES in step S832), the processing proceeds to step S833. In a case where there is no entry omission (NO in step S832), the processing proceeds to step S834. In step S833, the CPU 602 displays an entry error.

In step S834, the CPU 602 determines whether the NFT issuance button 745 has been pressed. In a case where the NFT issuance button 745 has been pressed (YES in step S834), the processing proceeds to step S835. In a case where the NFT issuance button 745 has not been pressed (NO in step S834), the processing proceeds to step S836.

In step S835, the CPU 602 transmits an NFT issuance request to the contract 301 of the blockchain 120 based on information entered on the upload screen 740.

In step S836, the CPU 602 determines whether the "return to previous display" button 724 has been pressed. In a case where the "return to previous display" button 724 has been pressed (YES in step S836), the CPU 602 ends the display control of the upload screen 740. In a case where the "return to previous display" button 724 has not been pressed (NO in step S836), the processing returns to step S831.

Figure 14:
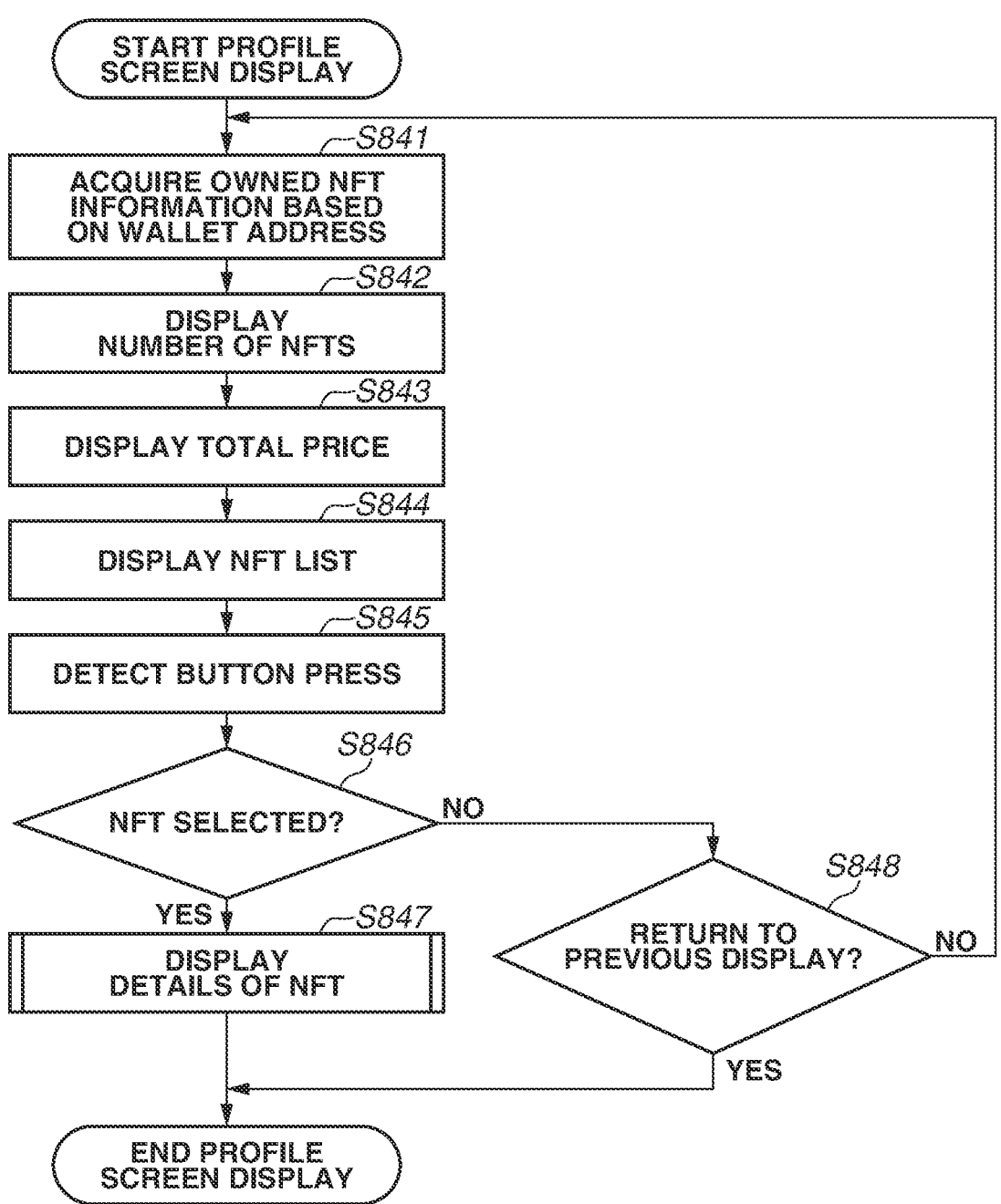
FIG. 14 is a flowchart illustrating display control of the profile screen to be displayed when a profile button is pressed.

FIG. 14 is a flowchart illustrating display control of the profile screen 750 to be displayed when the profile button 717 or 732 is pressed.

In step S841, the CPU 602 acquires NFT information owned by a wallet address. The CPU 602 refers to the owner address of NFT information from the NFT list handled on the MP 110 and acquires NFT information of the same address as a wallet address to be displayed.

In step S842, the CPU 602 displays the total number of acquired NFTs in the region 751.

In step S843, the CPU 602 obtains the total price of the acquired NFTs and displays the total price in the region 752.

In step S844, the CPU 602 displays an NFT list owned by the wallet address on the profile screen 750.

In step S845, the CPU 602 detects pressing of a button.

In step S846, the CPU 602 determines whether one NFT in the displayed NFT list that corresponds to the detected button has been selected. In a case where one NFT has been selected (YES in step S846), the processing proceeds to step S847. In a case where a button other than the NFTs has been pressed (NO in step S846), the processing proceeds to step S848.

In step S847, the CPU 602 executes the NFT detailed display described with reference to FIG. 12.

In step S848, the CPU 602 determines whether the press of the "return to previous display" button 724 has been detected. In a case where the press of the "return to previous display" button 724 has been detected (YES in step S848), the CPU 602 ends the display of the profile screen 750. In a case where the press of the "return to previous display" button 724 has not been detected (NO in step S848), the processing returns to step S841.

Figure 15:
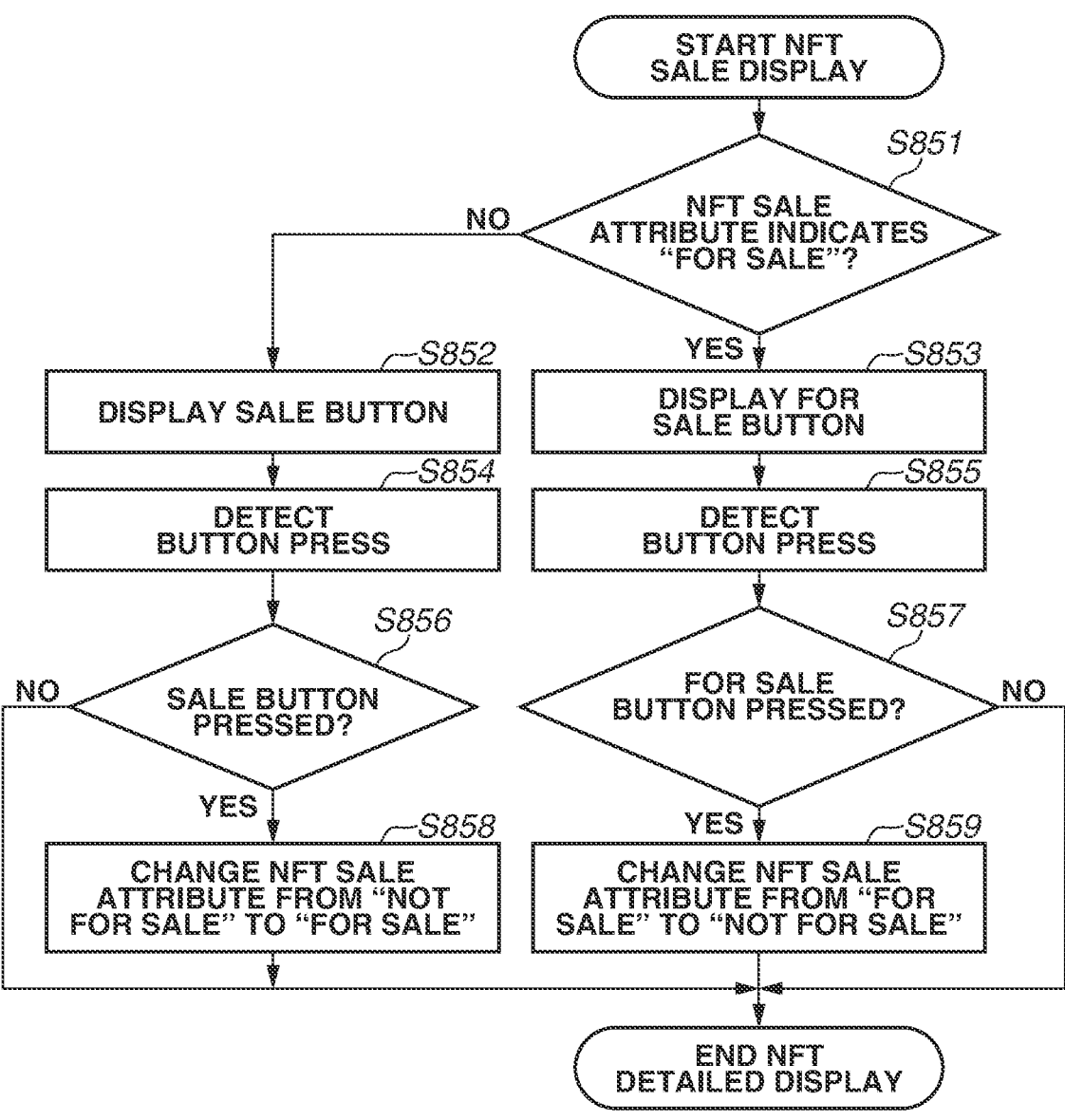
FIG. 15 is a flowchart illustrating an example of processing of an NFT sale display.

FIG. 15 is a flowchart illustrating an example of processing of an NFT sale display in step S823.

In step S851, the CPU 602 acquires a sale attribute of an NFT from a displayed NFT attribute, and determines whether the acquired sale attribute indicates "for sale". In a case where the sale attribute indicates "for sale" (YES in step S851), the processing proceeds to step S853. In a case where the sale attribute indicates "not for sale" (NO in step S851), the processing proceeds to step S852.

In step S852, the CPU 602 displays the NFT sale button 723. In step S853, the CPU 602 displays the NFT for sale button 725. In step S854, the CPU 602 detects the press of various buttons. In step S855, the CPU 602 detects the press of various buttons.

In step S856, the CPU 602 determines whether the press of the NFT sale button 723 has been detected. In a case where the press of the NFT sale button 723 has been detected (YES in step S856), the processing proceeds to step S858. In a case where the press of the NFT sale button 723 has not been detected (NO in step S856), the CPU 602 ends the NFT sale display.

In step S857, the CPU 602 determines whether the press of the NFT for sale button 725 has been detected. In a case where the press of the NFT for sale button 725 has been detected (YES in step S857), the processing proceeds to step S859. In a case where the press of the NFT for sale button 725 has not been detected (NO in step S857), the CPU 602 ends the NFT sale display.

In step S858, the CPU 602 transmits a transaction for changing an NFT sale attribute from "not for sale" to "for sale", to the blockchain 120, and changes the NFT sale attribute to "for sale".

In step S859, the CPU 602 transmits a transaction for changing an NFT sale attribute from "for sale" to "not for sale", to the blockchain 120, and changes the NFT sale attribute to "not for sale".

As described above, the processing in the flowcharts for an NFT sale display ends, and the processing proceeds to step S825.

Figure 16:
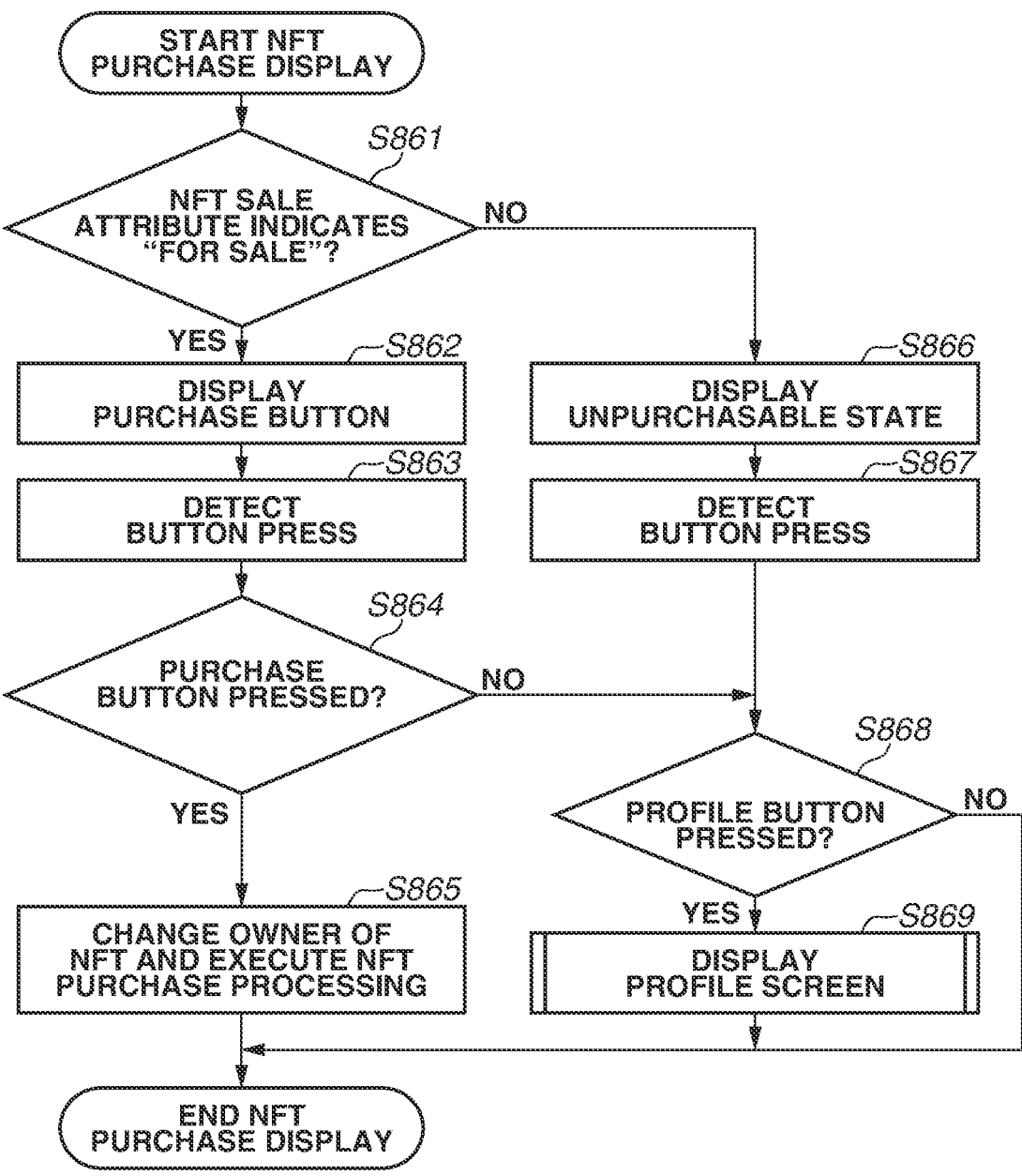
FIG. 16 is a flowchart illustrating an example of processing of an NFT purchase display.

FIG. 16 is a flowchart illustrating an example of processing for an NFT purchase display.

In step S861, the CPU 602 acquires a sale attribute of an NFT from a displayed NFT attribute, and determines whether the acquired sale attribute indicates "for sale". In a case where the sale attribute indicates "for sale" (YES in step S861), the processing proceeds to step S862. In a case where the sale attribute indicates "not for sale" (NO in step S861), the processing proceeds to step S866.

In step S862, the CPU 602 displays the NFT purchase button 736. In step S863, the CPU 602 detects pressing of a button.

In step S864, the CPU 602 determines whether the press of the NFT purchase button 736 has been detected. In a case where the press of the NFT purchase button 736 has been detected (YES in step S864), the processing proceeds to step S865. In a case where the press of the NFT purchase button 736 has not been detected (NO in step S864), the processing proceeds to step S868.

In step S865, the CPU 602 generates a transaction for changing the owner of an NFT in the blockchain 120, and executes NFT purchase processing.

In step S866, the CPU 602 displays the NFT purchase button 733 in an NFT purchase disabled state (unpurchasable display).

In step S867, the CPU 602 detects pressing of a button. In step S868, the CPU 602 determines whether the press of the profile button 732 has been detected. In a case where the press of the profile button 732 has been detected (YES in step S867), the processing proceeds to step S869. In a case where the press of the profile button 732 has not been detected (NO in step S867), the CPU 602 ends the processing of the NFT purchase display. As described above, the processing in the flowchart of the NFT purchase display ends, and the processing proceeds to step S825. In step S869, the CPU 602 displays the profile screen 750.

Processing to be executed by a web service on the MP 110 for selling and purchasing an NFT has been described with reference to the flowcharts illustrated in FIGS. 11 to 16. According to the present exemplary embodiment, it is possible to automatically switch display between an NFT sale display and an NFT purchase display based on a sale attribute of an NFT and a wallet address used when a connection to the MP 110 is established. In addition, it is possible to manage all processes from NFT issuance up to NFT sale and purchase in the blockchain 120 by using the MP 110.

<Sequence Diagram of Processing to be Executed Between Smart Contract, Market-Place, And MFP>

Figure 17:
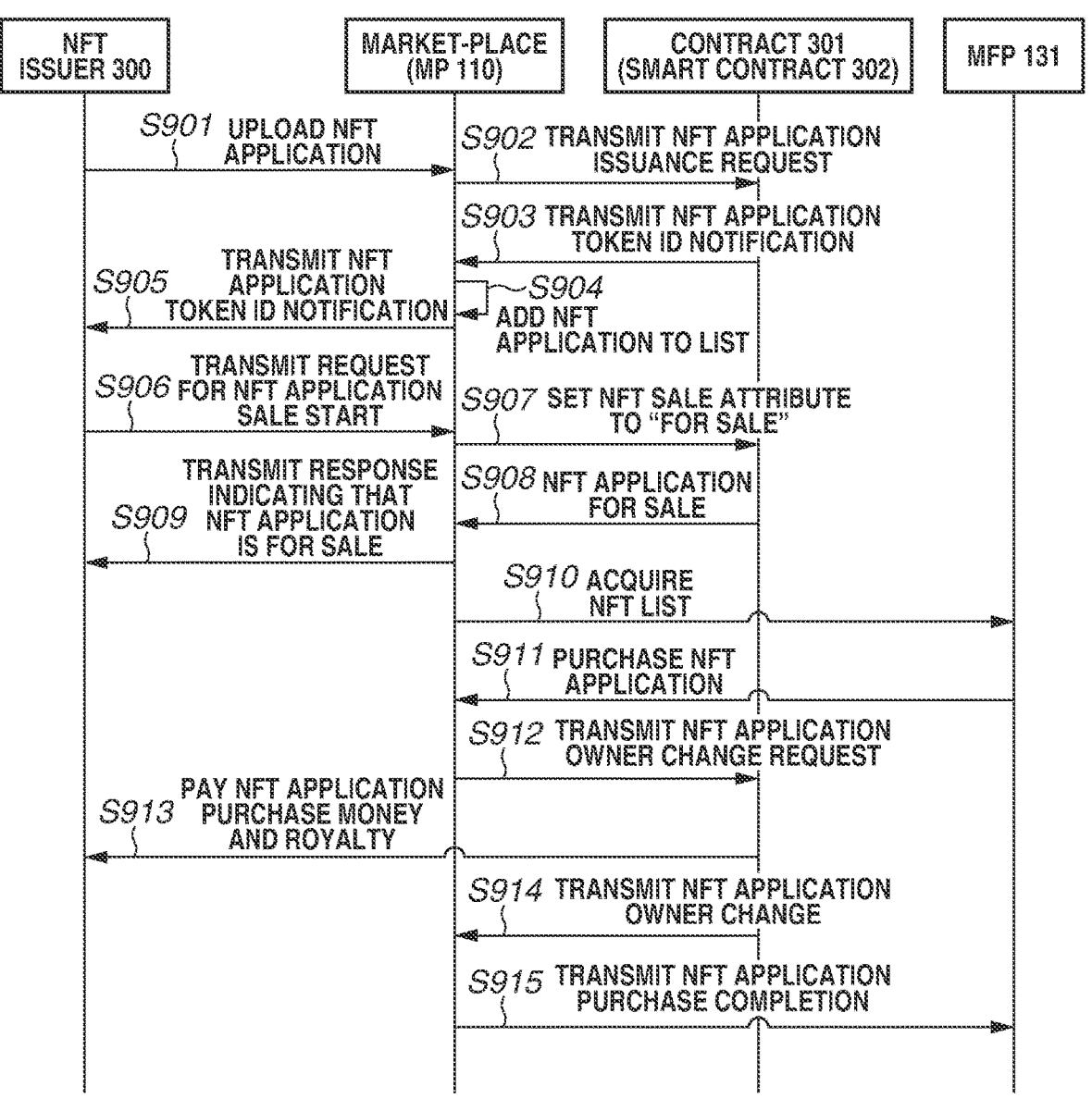
FIG. 17 is a sequence diagram illustrating an example of processing from the issuance to the purchase of the application NFT.

FIG. 17 is a sequence diagram illustrating an example of processing from the issuance to the purchase of the application NFT 116.

In the blockchain 120, a block of the contract 301 that executes issuance and transfer of an NFT exists, and by calling this block using the RPC, the smart contract 302 is executed. In the called RPC, an application program interface (API) for NFT issuance/NFT transfer/NFT information acquisition is prepared, and the RPC is executed when an operation on an NFT is performed in the MP 110.

In step S901, the NFT issuer 300 uploads the application 101 to the MP 110, and issues an application NFT issuance request.

In step S902, the MP 110 transmits an application NFT issuance request to the contract 301. The contract 301 generates the entity of the application NFT 116 using the implemented smart contract 302, determines a token ID corresponding to the application NFT 116, and sets the NFT issuer 300 as a distributor of the application NFT 116.

In step S903, the contract 301 notifies the MP 110 of the token ID generated using the smart contract 302.

In step S904, the MP 110 adds the application NFT 116 to a list of NFTs managed in the storage device 605 of the information processing apparatus that provides the MP 110.

In step S905, the MP 110 notifies the NFT issuer 300 of the token ID of the application NFT 116.

In step S906, the NFT issuer 300 transmits a request for executing the sale start processing 325 for the application NFT to the MP 110.

In step S907, the MP 110 generates a transaction for changing a sale attribute in NFT information of the application NFT 116 from "not for sale" to "for sale", in the contract 301, and issues a request to add the transaction to the blockchain 120.

If the generated transaction is added to the blockchain 120, in step S908, the MP 110 can confirm that the sale attribute has been changed to "for sale".

In step S909, the NFT issuer 300 receives the for-sale response 326 regarding the application NFT 116 from the MP 110.

In step S910, the MFP 131 connects to the MP 110 and acquires an NFT list.

In step S911, the MFP 131 transmits a request for executing the purchase start processing 333 for the application NFT 116 to the MP 110.

In step S912, the MP 110 transmits, to the contract 301, a request to add an owner change block for changing the owner of the application NFT 116 to the MFP 131.

In step S913, the contract 301 executes the smart contract 302, and transmits royalty and purchase money for the application NFT 116 to the NFT issuer 300.

In step S914, the contract 301 transmits, to the MP 110, a notification indicating that the block for changing the owner of the application NFT has been added in the smart contract 302.

In step S915, the MFP 131 receives the purchase completion response 332 regarding the application NFT 116 from the MP 110.

The flow of the sequence of the processing to be executed when the application NFT 116 is purchased from the MP 110 has been described above. The processing enables the NFT issuer 300 to issue and sell an NFT using the smart contract 302 by preparing a block of the contract 301 in the blockchain 120. The MFP 131 becomes able to purchase an NFT via the MP 110.

Figure 18:
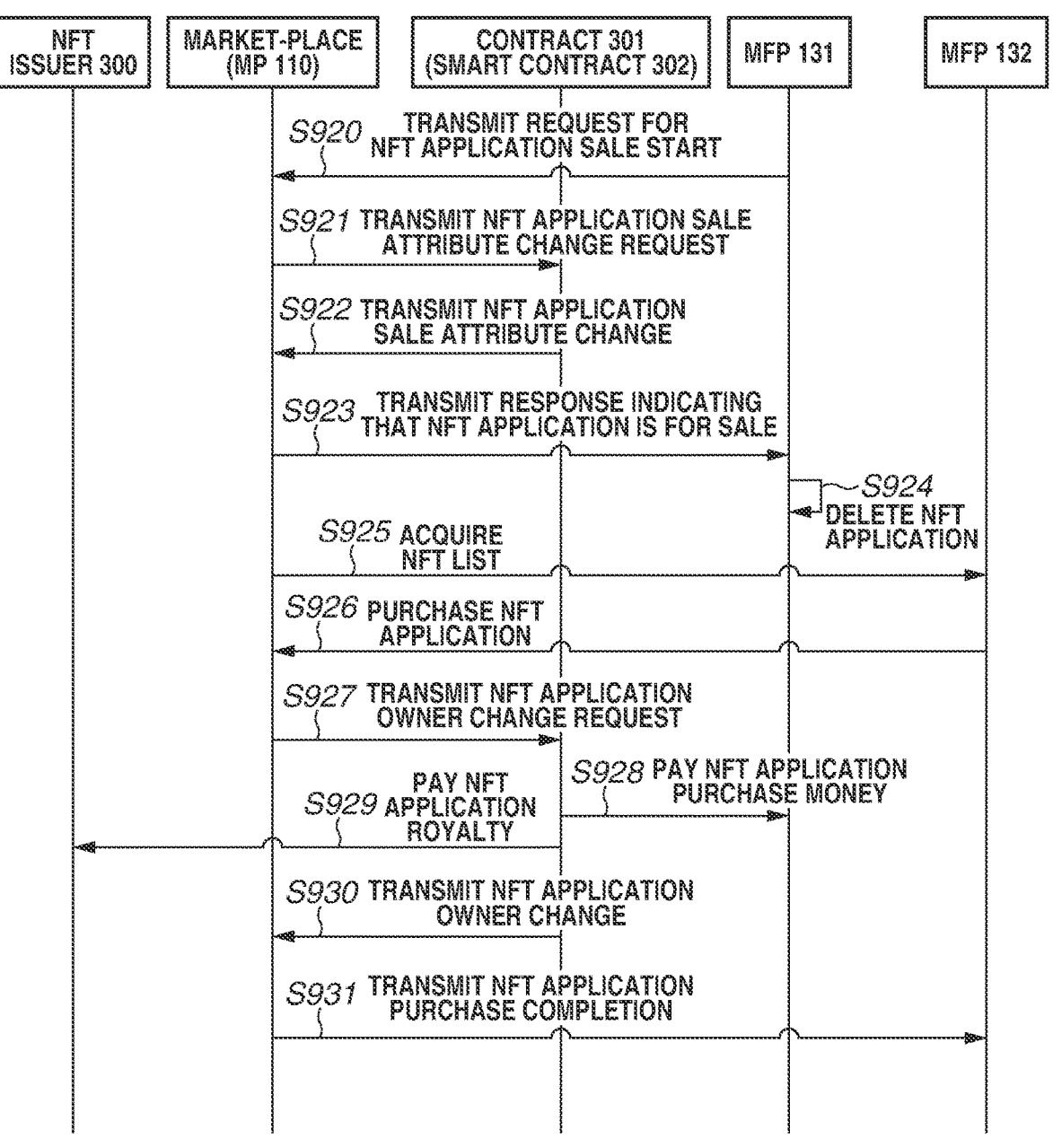
FIG. 18 is a sequence diagram illustrating an example of processing to be executed when the purchased application NFT is secondarily distributed.

FIG. 18 is a sequence diagram illustrating an example of processing to be executed when the purchased application NFT 116 is secondarily distributed.

In step S920, the MFP 131 transmits a request for the sale start processing 325 to sell the purchased application NFT 116 on the MP 110.

In step S921, the MP 110 requests the contract 301 to change a sale attribute of the application NFT 116. The contract 301 executes the smart contract 302, and creates a transaction with the sale attribute changed.

In step S922, the contract 301 adds the transaction of which the sale attribute of the application NFT 116 has been changed, to the blockchain 120.

In step S923, the MP 110 transmits, to the MFP 131, the for-sale response 326 indicating that the sale attribute of the application NFT 116 has been changed to "for sale".

In step S924, the MFP 131 deletes the application 101 corresponding to the application NFT 116, from the storage device 405.

In step S925, the MFP 132 connects to the MP 110 and acquires an NFT list. In step S926, the MFP 132 issues a request to purchase the application NFT 116 in the purchase start processing 333.

In step S927, the MP 110 requests the contract 301 to change the owner of the application NFT 116.

In step S928, the contract 301 executes the smart contract 302, and pays purchase money for the application NFT 116 to the MFP 131.

In step S929, the contract 301 executes the smart contract 302, and pays royalty for the application NFT 116 to the NFT issuer 300.

In step S930, the MP 110 executes the smart contract 302, and receives a notification indicating that a transaction for changing the owner of the application NFT 116 has been added.

In step S931, the MFP 132 receives the purchase completion response 332 regarding the application NFT 116, and becomes the owner of the application NFT 116.

As described above with reference to FIG. 18, the processing of changing the owner of the application NFT 116 from the MFP 131 to the MFP 132 is processed by the smart contract 302 on the blockchain 120, so that the change of the owner can be performed by this system that prevents any improper change of the owner.

In the first exemplary embodiment, the description has been given of an NFT delivery system for purchasing and selling an application operating on the MFP 131 and an NFT associated with the application.

According to the first exemplary embodiment, the MP 110 issues an NFT associated with an application operating on the MFP 131, and the MFP 131 purchases the issued NFT. The purchase of the NFT enables the application to be applied to the MFP 131. Because the application is provided in association with the NFT, it is possible to deliver the application using the system in which, even if the application is merely copied into a different MFP, the application cannot be downloaded unless the MFP is the owner of the NFT. In addition, it is also possible to sell or purchase an NFT downloaded on an MFP in a secondary distribution. At the time of replacement of an MFP, it is possible to apply a purchased NFT to another MFP after replacement without newly purchasing the same NFT. Further, by describing the model and the capability of an MFP and the entity of an application in NFT information, it is possible to apply the entity of correct digital data based only on the "name" of the NFT.

Furthermore, a market-place that sells an NFT can easily perform sale and purchase operations by comparing the owner of an NFT and the wallet address of an MFP that has accessed the market-place and automatically switching between an NFT sale button and an NFT purchase button.

<Exemplary Embodiment 2 for Applying NFT to MFP>

Figure 19:
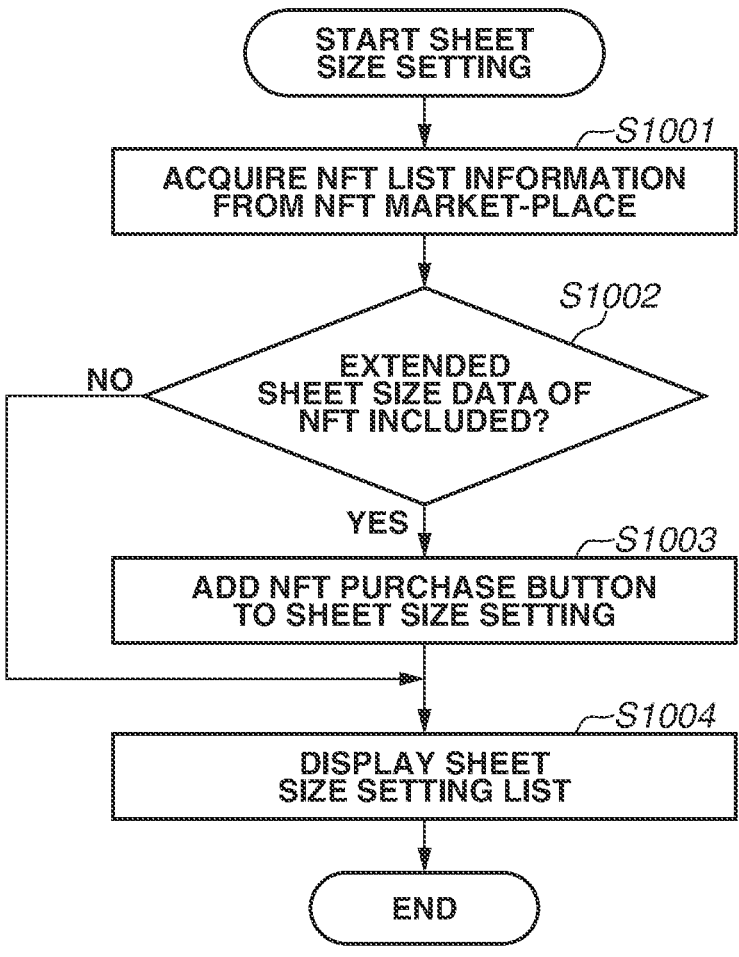
FIG. 19 is a flowchart illustrating an example of processing of displaying a purchase button in a case where a sheet size setting includes a sheet size addable as an NFT.

FIG. 19 is a flowchart illustrating an example of processing of displaying a purchase button in a case where a sheet size setting includes a sheet size addable as an NFT.

In step S1001, the CPU 402 connects to the MP 110 and acquires NFT list information.

In step S1002, the CPU 402 searches the NFT list information acquired in step S1001 for extended data regarding a sheet size. In a case where extended data regarding a sheet size applicable to the MFP 131 is included (YES in step S1002), the processing proceeds to step S1003. In a case where extended data regarding a sheet size applicable to the MFP 131 is not included (NO in step S1002), the processing proceeds to step S1004. In a case where extended data has already been acquired and addable extended data is not included, it may be determined that a sheet size applicable to the MFP 131 is not included (NO in step S1002), and the processing may be ended.

An example in which extended data regarding a sheet size is described in the metadata 331 of an NFT is given below. In step S1002, the CPU 402 searches for the data (attribute: "category": "sheet size").

```
extended sheet size data (B series).Json:
{
attribute:{
"category"'sheet size",
"support":[{
"model":["MFP1","MFP2","MFP3"],
"sheet size":["B6","B5"],
"extended data":"https://ipfs/B series size.dat",
},{
"model":"MFP4",
"sheet size":["B5","B4",],
"extended data":"https://ipfs/B-series size 2.dt"
}],
"description":"added data of B-series sheet size",
"image":"https://ipfs/extended sheet size data (B series).jpg",
"name":"extended sheet size data (B series)",
}
```

The "attribute" defines "sheet size" in "category", and in "support", a plurality of sheet sizes is further defined in an array assuming that that a range from the minimum B-series size to the maximum B-series size varies for each supported model.

The "model" collectively defines a plurality of models that uses the same sheet size or sizes in an array that "sheet size" and "extended data" are the same. In the "sheet size", a name of a B-series sheet size to be added to list display is set.

The "extended data" is main body data for adding a sheet size to a sheet size setting. The "extended data" is to be stored into an MFP. The "description", the "image", and the "name" are the same as those described in the first exemplary embodiment.

In step S1003, the CPU 402 adds the NFT purchase button 210 to the sheet size setting screen 201. In step S1004, the CPU 402 displays the sheet size setting screen 201, and performs list display of sheet size settings. The sheet size list displayed in this step is to be used as a setting of a sheet size when the print engine 413 of the MFP 131 prints an image.

As described above with reference to FIG. 19, by displaying the NFT purchase button 210 on an MFP depending on whether there is an NFT for extending the setting of a sheet size, it makes it possible to add a supported sheet size setting for each model.

FIG. 20 is a flowchart illustrating an example of processing of downloading extended sheet size data of an NFT from the MP 110 and adding the extended sheet size data to a sheet size setting of the MFP 131.

In step S1010, the CPU 402 detects the press of the NFT purchase button 210.

In step S1011, the CPU 402 connects to the MP 110, acquires NFT information in which "sheet size" is set as "category" from the metadata 331 of NFT information, and displays an NFT list (not illustrated).

In step S1012, if the CPU 402 detects the press of the extended sheet size (B series) NFT 114 on the NFT list, the CPU 402 acquires NFT information of the extended sheet size (B series) NFT 114.

In step S1013, the CPU 402 analyzes the metadata 331 of the extended sheet size (B series) NFT 114, and determines whether the extended sheet size (B series) NFT 114 is applicable to the MFP 131. In a case where the MFP 131 corresponds to a supported model (YES in step S1013), the processing proceeds to step S1014. In a case where the MFP 131 does not correspond to a supported model (NO in step S1013), the processing proceeds to step S1019.

In step S1014, the CPU 402 transmits a request to execute the purchase start processing 333 for the extended sheet size (B series) NFT 114 to the MP 110.

In step S1015, the CPU 402 displays a message indicating that the extended sheet size (B series) NFT 114 is being purchased in the status display portion on the operation panel 409 until a response is returned from the MP 110.

In step S1016, the CPU 402 receives the purchase completion response 332 regarding the extended sheet size data (B series) from the MP 110.

In step S1017, the CPU 402 determines whether the purchase of the NFT (owner movement) has succeeded, based on the purchase completion response 332 regarding the extended sheet size data (B series). In a case where the purchase has succeeded (YES in step S1017), the processing proceeds to step S1020. In a case where the purchase has failed (NO in step S1017), the processing proceeds to step S1018.

In step S1018, the CPU 402 displays a message indicating that "purchase has failed" on the operation panel 409.

In step S1019, the CPU 402 displays a message indicating that "there is no applicable NFT" on the operation panel 409.

In step S1020, the CPU 402 acquires NFT information from the MP 110 as the owner of the extended sheet size (B series) NFT 114.

In step S1021, the CPU 402 acquires the extended sheet size data (B series) 103 which is the entity of the extended sheet size data (B series) from NFT information, adds B series sheet sizes to a sheet size setting, and displays the B series sheet sizes like B5 (NFT) and B4 (NFT) on the screen 202.

As described above with reference to FIGS. 19 and 20, it is possible to purchase an NFT of the type of a sheet size of a sheet size setting of the MFP 131 to thereby extend the sheet size setting.

In the second exemplary embodiment, by adding a category as NFT information, it is possible to narrow down applicable NFTs in accordance with a screen for purchasing an NFT. Because only a selectable NFT is displayed, the user can easily purchase an NFT. In addition, because a supported model and the type of a sheet size can be freely described in the metadata 331 of an NFT, there is no concern that wrong extended data may be downloaded. Because the uniqueness of an NFT is assured, it is possible to execute data extension with high reliability from the viewpoint of user guarantee.

<Exemplary Embodiment 3 for Applying NFT to MFP>

Figure 21:
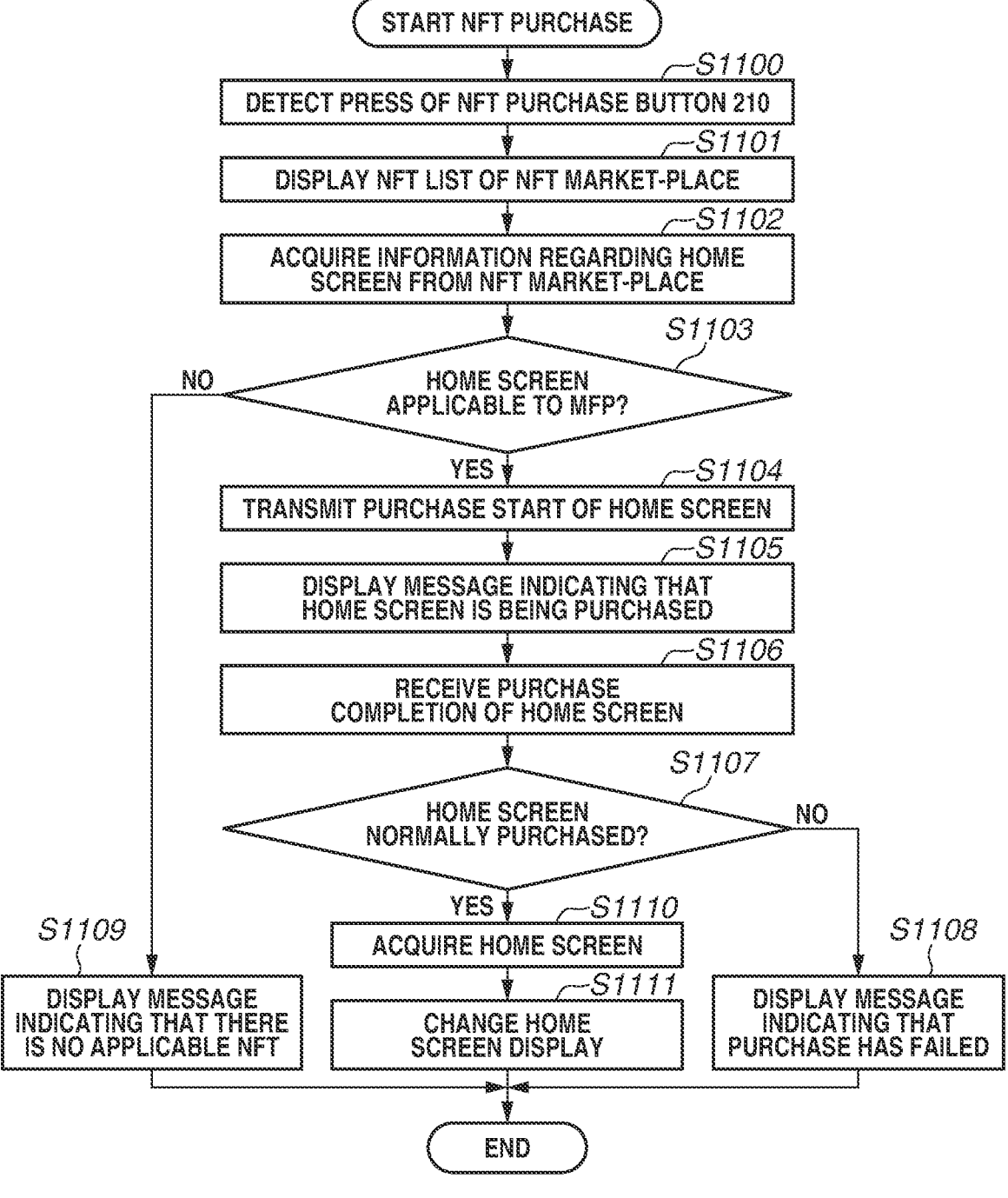
FIG. 21 is a flowchart illustrating an example of processing of applying an NFT of a home screen to the MFP.

FIG. 21 is a flowchart illustrating an example of processing of applying an NFT of a home screen to the MFP 131. Because the display of home screen 203 is similar to that described with reference to FIG. 5, the description thereof will be omitted.

First of all, a description example of the metadata 331 of an NFT related to the home screen NFT 115 is given below.

home screen.Json:
{
"attribute":{
"category":"home screen format",
"supported":[{
"model":["MFP1","MFP2","MFP3"],
"panel type":"5-inch WVGA",
"extended data":"https://ipfs/HOME.dat",
},{
"model":"MFP4",
"panel type":"8-inch WVGA",
"extended data":"https://ipfs/HOME2.dat"
}],
},
"description":"change icon style on home screen to round shape",
"image":"https://ipfs/HOME sample.jpg",
"name":"home screen",
}

The "attribute" defines the "home screen format" in "category", and in "support", a plurality of formats is further defined in an array assuming that display control of the home screen varies for each supported model.

The "model" collectively defines a plurality of models that commonly uses the same panel type and the home screen NFT 115 in an array that "panel type" and "extended data" are the same.

The "panel type" defines the size of a screen of the operation panel 409. In this example, "5-inch WVGA" and "8-inch WVGA" are defined as the "panel type".

The "extended data" is a main body data for changing a display format of the home screen. The "extended data" is stored into the storage device 605 of the MFP. The "description", the "image", and the "name" are the same as those described above.

FIG. 21 is a flowchart illustrating an example of processing of changing a display format of a home screen of the MFP 131.

In step S1100, the CPU 402 detects the press of the NFT purchase button 210. In step S1101, the CPU 402 connects to the MP 110 and displays an NFT list (not illustrated).

In step S1102, if the CPU 402 detects the selection of the home screen NFT 115 from the NFT list, the CPU 402 acquires NFT information of the home screen NFT 115.

In step S1103, the CPU 402 analyzes the metadata 331 of the home screen NFT 115, and determines whether the home screen NFT 115 is applicable to the MFP 131. In a case where "model" in the metadata 331 is identical to the MFP 131 (YES in step S1103), the processing proceeds to step S1104. In a case where "model" in the metadata 331 is not identical to the MFP 131 (NO in step S1103), the processing proceeds to step S1109.

In step S1104, the CPU 402 transmits a request to execute the purchase start processing 333 for the home screen NFT 115 to the MP 110.

In step S1105, the CPU 402 displays a message indicating that the home screen NFT 115 is being purchased in the status display portion on the operation panel 409 until a response is returned from the MP 110.

In step S1106, the CPU 402 receives the purchase completion response 332 regarding the home screen NFT 115 from the MP 110.

In step S1107, the CPU 402 determines whether the purchase of the NFT (owner movement) has succeeded based on the purchase completion response 332 regarding the home screen NFT 115. In a case where the purchase has succeeded (YES in step S1107), the processing proceeds to step S1110. In a case where the purchase has failed (NO in step S1107), the processing proceeds to step S1108.

In step S1108, the CPU 402 displays a message indicating that "purchase has failed" on the operation panel 409.

In step S1109, the CPU 402 displays a message indicating that "there is no applicable NFT" on the operation panel 409.

In step S1110, the CPU 402 acquires NFT information from the MP 110 as the owner of the home screen NFT 115.

In step S1111, the CPU 402 acquires the home screen data which is the entity of the home screen NFT 115 from NFT information, and displays buttons on the home screen in a round shape as in the home screen 204.

As described above with reference to FIG. 21, it is possible to purchase an NFT of the home screen NFT 115 of the MFP 131, and change the format of home screen display.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-010027, which was filed on Jan. 26, 2023 and which is hereby incorporated by reference herein in its entirety.

What is claimed is:

1. An image processing apparatus comprising:
a printer that prints an image on a sheet;
one or more memories; and
one or more processors, wherein the one or more memories and the one or more processors are configured to:
store a wallet address;
receive an instruction to execute a print application installed on the image processing apparatus, wherein the print application corresponds to a non-fungible token (NFT), wherein the NFT corresponds to transaction data, and wherein the transaction data includes an address of a transmission destination of the NFT;
obtain, in response to the instruction, latest transaction data of the NFT from a node of a blockchain that manages the NFT;
determine whether the address included in the obtained latest transaction data is identical to the stored wallet address;
execute the print application in a case where the address of the obtained latest transaction data is identical to the stored wallet address, wherein the printer prints, based on the execution of the print application, an image on a sheet; and
prevent any execution of the print application in a case where the address included in the obtained latest transaction data is not identical to the stored wallet address.

2. The image processing apparatus according to claim 1, wherein the one or more memories and the one or more processors are further configured to obtain the transaction data via a service that provides transactions of a plurality of NFTs including the NFT.

3. The image processing apparatus according to claim 1, wherein the obtained latest transaction data is managed by the blockchain and generated based on information regarding a transaction of the NFT.

4. The image processing apparatus according to claim 1, wherein the one or more memories and the one or more processors are further configured to delete, in response to the instruction, the print application from the image processing apparatus in a case where the address included in the obtained latest transaction data is not identical to the stored wallet address.

5. The image processing apparatus according to claim 1, wherein the one or more memories and the one or more processors are further configured to install the print application on the image processing apparatus upon completion of purchase of the NFT of the print application.

6. The image processing apparatus according to claim 1, further comprising:
a scanner configured to generate image data by scanning an image on a document,
wherein the one or more memories and the one or more processors are further configured to transmit the image data generated by the scanner upon execution of a scan application installed in the image processing apparatus,
wherein the one or more memories and the one or more processors are further configured to receive an instruction to execute the scan application, wherein the scan application corresponds to another NFT, wherein the other NFT corresponds to transaction data, and wherein the transaction data includes an address of a transmission destination of the other NFT,
wherein the one or more memories and the one or more processors are further configured to obtain, in response to the instruction to execute the scan application, latest transaction data of the other NFT from a node of a blockchain that manages the other NFT,
wherein the one or more memories and the one or more processors are further configured to determine whether the address included in the obtained latest transaction data of the other NFT is identical to the stored wallet address,
wherein the one or more memories and the one or more processors are further configured to execute the scan application in a case where the address of the obtained latest transaction data of the other NFT is identical to the stored wallet address, and wherein the one or more memories and the one or more processors are further configured to prevent any execution of the scan application in a case where the address included in the obtained latest transaction data of the other NFT is not identical to the stored wallet address.

7. An image processing system comprising:

one or more memories; and one or more processors, wherein the one or more memories and the one or more processors are configured to:

store a wallet address;

receive an instruction to execute a print application installed on an image processing apparatus having a printer, wherein the print application corresponds to a non-fungible token (NFT), wherein the NFT corresponds to transaction data, and wherein the transaction data includes an address of a transmission destination of the NFT;

obtain, in response to the instruction, latest transaction data of the NFT from a node of a blockchain that manages the NFT;

determine whether the address included in the obtained latest transaction data is identical to the stored wallet address;

execute the print application in a case where the address of the obtained latest transaction data is identical to the stored wallet address, wherein the printer prints, based on the execution of the print application, an image on a sheet; and prevent any execution of the print application in a case where the address included in the obtained latest transaction data is not identical to the stored wallet address.

8. The image information processing system according to claim 7, wherein the one or more memories and the one or more processors are further configured to obtain the latest transaction data via a service that provides transactions of a plurality of NFTs including the NFT.

9. The image processing system according to claim 7, wherein the obtained latest transaction data is managed by the blockchain and generated based on information regarding a transaction of the NFT.

10. The image processing system according to claim 7, wherein the one or more memories and the one or more processors are further configured to delete, in response to the instruction, the print application from the image processing apparatus in a case where the address included in the obtained latest transaction data is not identical to the stored wallet address.

11. The image processing system according to claim 7, wherein the one or more memories and the one or more processors are further configured to install the print application on the image processing apparatus upon completion of purchase of the NFT of the print application.

12. The image processing system according to claim 7, further comprising:

a scanner configured to generate image data by scanning an image on a document, wherein the one or more memories and the one or more processors are further configured to transmit the image data generated by the scanner upon execution of a scan application installed in the image processing apparatus, wherein the one or more memories and the one or more processors are further configured to receive an instruction to execute the scan application, wherein the scan application corresponds to another NFT, wherein the other NFT corresponds to transaction data, and wherein the transaction data includes an address of a transmission destination of the other NFT, wherein the one or more memories and the one or more processors are further configured to obtain, in response to the instruction to execute the scan application, latest transaction data of the other NFT from a node of a blockchain that manages the other NFT, wherein the one or more memories and the one or more processors are further configured to determine whether the address included in the obtained latest transaction data of the other NFT is identical to the stored wallet address, wherein the one or more memories and the one or more processors are further configured to execute the scan application in a case where the address of the obtained latest transaction data of the other NFT is identical to the stored wallet address, and wherein the one or more memories and the one or more processors are further configured to prevent any execution of the scan application in a case where the address included in the obtained latest transaction data of the other NFT is not identical to the stored wallet address.

* * * * *